US012486713B2

(12) United States Patent
Fischer et al.

(10) Patent No.: US 12,486,713 B2
(45) Date of Patent: Dec. 2, 2025

(54) DOOR FOR A LABORATORY WORKSTATION

(71) Applicant: TECAN TRADING AG, Mannedorf (CH)

(72) Inventors: Roland Fischer, Hinwil ZH (CH); Andre Haefelfinger, Oberneunforn (CH); Antono Djojoatmodjo, Bauma (CH)

(73) Assignee: TECAN TRADING AG, Mannedorf (CH)

( * ) Notice: Subject to any disclaimer, the term of this patent is extended or adjusted under 35 U.S.C. 154(b) by 897 days.

(21) Appl. No.: 17/553,363

(22) Filed: Dec. 16, 2021

(65) Prior Publication Data

US 2022/0195752 A1 Jun. 23, 2022

(30) Foreign Application Priority Data

Dec. 23, 2020 (EP) .................................... 20216944

(51) Int. Cl.
*E06B 3/44* (2006.01)
*B01L 1/00* (2006.01)
*B25J 21/00* (2006.01)
*E05B 47/00* (2006.01)
*E06B 5/00* (2006.01)

(52) U.S. Cl.
CPC .................. *E06B 3/44* (2013.01); *B01L 1/00* (2013.01); *B25J 21/00* (2013.01); *E06B 5/00* (2013.01); *B01L 2200/085* (2013.01); *E05B 2047/0067* (2013.01)

(58) Field of Classification Search
None
See application file for complete search history.

(56) References Cited

U.S. PATENT DOCUMENTS

2024/0351017 A1* 10/2024 Chen ...................... G16H 10/40
2025/0161949 A1* 5/2025 Qualizza .................. B01L 9/02

FOREIGN PATENT DOCUMENTS

DE 102013008019 A1 11/2014

OTHER PUBLICATIONS

English Translation of CN 110748266 A. (Year: 2020).*
English translation of DE 102013008019 A1. (Year: 2014).*
European Search Report for corresponding European patent application No. EP 20216944, dated May 31, 2021.

* cited by examiner

*Primary Examiner* — Lore R Jarrett
(74) *Attorney, Agent, or Firm* — Notaro, Michalos & Zaccaria P.C.

(57) ABSTRACT

A door for a laboratory workstation is disclosed. The laboratory workstation has a horizontally extending work surface for providing a working area. The door is movable in relation to the work surface in a vertical direction perpendicular to the work surface between a safety position, in which the door closes the working area for manual access of a user, an access position in which the working area is open for manual access of a user, and a loading position.

16 Claims, 9 Drawing Sheets

DOOR FOR A LABORATORY WORKSTATION

TECHNICAL FIELD OF THE INVENTION

The current invention relates to a door for a laboratory workstation. Said laboratory workstation comprises a horizontally extending work surface for providing a working area thereon. The door is configured to be movable in relation to the work surface between a safety position, in which the door closes the working area for manual access of a user, and an access position in which the working area is open for manual access of a user. The invention further relates to a laboratory workstation and a method of controlling a manual access to a workstation of a laboratory workstation.

DESCRIPTION OF THE RELATED ART

Automating of laboratory processes, for example for increasing throughput and reducing mistakes, is widely known in the art. Several basic laboratory processes are possible to be carried out in an automated manner on distinct devices, named herein laboratory workstations. Automated laboratory processes involve for example the transport and/or sorting of laboratory equipment such as laboratory tubes, basins, and/or container for receiving or handling liquids, but may involve also liquid handling processes such as aspirating and/or dispensing liquids, or other operations related to the handling of liquids which for example require the use of additional devices, such as heating or cooling devices, mixing devices, etc. The goods required for a desired process are ideally provided before the begin of the process, to allow the process being carried out undisturbed. The provision and/or configuration of the goods, such as laboratory equipment, is often carried out manually by a user. As the automated processes typically involve the application of robotic systems, for example robotic arms for moving items, or pipetting heads for handling fluids or liquids, special care must be taken to secure that no undesired interaction of a user with a robotic system takes places while a robotic item is operating, to protect the user and to ensure that the automated process remains undisturbed. As a safety measurement, the use of a protection screen is known. Such a protection screen separates a working area of the laboratory workstation, where the robotic items are operating, from interferences by a user. The screen may be removed when the automation process is completed. Often, such screens are configured as doors, which are movable up and down for closing and opening.

SUMMARY OF THE INVENTION

It is an object of the present invention to provide an alternative solution for protecting a working area of a laboratory workstation from undesired interference by a user while allowing access of a user when it is required.

This problem is solved by the provision of a door for a laboratory workstation according to the invention. Said laboratory workstation comprises a horizontally extending work surface for providing a working area thereon. The door is configured being movable in relation to the work surface in a vertical direction perpendicular to the work surface between a safety position, in which the door closes the working area for manual access of a user, an access position in which the working area is open for manual access of a user, and a loading position.

According to the invention, the door comprises an access opening which is configured for being reversibly changeable between an open status or a closed status, for allowing or restricting a limited, manual access of a user to the working area. In the safety position, the access opening is in the closed status by being positioned by the door below the work surface. In the loading position, the access opening is aligned to the work surface into the loading status for allowing limited access to the working area. The position of the door is under the control of a processing unit. Said processing unit is further configured to control one or more automated process operations in the working area or parts thereof in dependence of the position of the door.

A door according to the present invention is understood as being a movable, separating protection device which is used for protecting for example people which are present in closed proximity of a device with one or more running machines, or for protecting such running devices from user. By way of example, a door may be a flat, protective screen like structure.

A door according to the present invention is particularly suitable for being used in laboratory workstations, such as liquid handling devices, in which robotic devices carry out distinct processes in an automated manner, as the processing of liquids may make it necessary to occasionally load or reload the liquid handling workstation with samples, reagents or other equipment. The door according to the present invention may however be further suitable for being used with other devices which involve an automated movement of devices with an occasional need to reach into the device although such devices shall preferably continue to move. In all these cases, the door may provide the possibility to indeed reach into the device without the need to fully stop an automated process while ensuring the safety of a user who must operate the device.

A door according to the invention is described in more detail in the context of a laboratory workstation, in which robotic devices are moving in relation to a work surface and a corresponding working area thereon and according to a desired operation. Typically, such process operations are deposited in form of a software in a processing unit which controls their execution as a higher-level control. Movability of the door is typically enabled between a safety position and an access position, for controlling the manual access of a user to the work surface and/or the working area. In the safety position, the door essentially closes the working area, and correspondingly also the work surface, thereby inhibiting manual access of a user. A gas and/or temperature exchange may be possible or not, as desired. In the access position, the door is moved away in a manner that the working area, and correspondingly the work surface, is open on the user side, so that a user may have access to essentially the full work surface. According to the invention, the door is movable into a loading position for allowing a limited access.

In the context of the present invention, a laboratory workstation is understood as a device for being used in for example chemical, biological or medical laboratories, for providing an automated solution of carrying out one or more simple or complex working processes. Such a laboratory workstation may typically comprise one or more robotic components for carrying out the desired process(es). Suitable laboratory workstations are for example devices for handling laboratory equipment, for example for sorting laboratory equipment or laboratory articles such as tubes, pipette tips, etc, or liquid handling devices for carrying out more complex process operations, such as pipetting operations, which may include for example the aspiration and/or dispense of a liquid using a pipetting head, and which may further include the transportation and/or sorting of a liquid handling tube on the working surface.

Such devices which are able to carry out liquid processing steps in an automated manner are also known as liquid handling workstations. By the use of such a liquid handling workstation, liquids may be pipetted between different vessels based on a preprogrammed process operation.

A process operation is in the present context a step or a plurality of steps or operations of a defined working process. The present invention particularly refers to a door for devices, on which such working processes may be carried out in a partial or fully automated manner. Possible processes which may be carried out automatically are for example the repositioning of laboratory articles or a pipetting of a liquid. Pipetting of a liquid includes for example the aspiration and the dispense of a liquid, as well as a mixing process, which is a repeated aspiration and dispensation. The repositioning may include for example moving of one or more robotic arms. Each process may often be subdivided into distinct substeps or process operations, respectively.

Complex process operations are then for example distinct process steps which are linked together in a specific order to a desired longer process. Complex process operations are for example the execution of dilution series, the execution of assays such as ELISAs (Enzyme-Linked Immunosorbent Assays), or the purification of nucleic acids such as DNA, using for example magnetic bead separation or solid phase extraction.

One or more process operations may be under the control of a processing unit. Such a processing unit, which may also be named herein processor or controller, may control such one or more process operations according to previously deposited commands. Such commands may for example be deposited in the form of a software program based on which the processing unit controls the laboratory workstation and/or functionally connected devices and/or robotic devices. Such robotic devices are for example robotic arms comprising one or more gripper, and/or pipetting heads. Devices which are connected with the laboratory workstation may be for example an incubator, a mixing device, a stacking device for laboratory articles, a centrifuge, and the like.

For controlling the one or more process operations, the processing unit is functionally connected to the laboratory workstation for which the door according to the invention is adapted. Such a processing unit typically controls for example a pipetting robot, the liquid to be used, steps of aspirating, dispensing and/or mixing, or other pipetting steps of a pipetting head, and/or may also control one or more function of other connected devices or robotic devices.

According to the invention, the status of the door, in particular the position of the door, is under the control of a processing unit. The processing unit may be the processing unit of an associated device, such as a laboratory workstation. Alternatively, the door may be functionally connected to its own processing unit which controls the position of the door. For a coordinated controlling of the door when being connected to a respective device, the processing unit of the door may be functionally connected to the processing unit of the associated device, e.g. of a laboratory workstation. A processing unit in the sense of the present invention may be an internal or an external processor. An internal processor is for example an integrated processor, while an external processor may for example be the processor of a personal computer or another functionally connected device.

A laboratory article may for example be a vessel for handling a sample. Such vessels are for example tubes made of glass or plastic and may be configured for receiving different volume sizes. For example, tubes for handling smaller volumes of a sample may be plastic tubes suitable for taking up small volumes of a liquid such as 10 μl, or up to 1500 μl, or tubes for larger volumes of a liquid up to 50 ml or 100 ml liquid. Vessels for taking up larger volumes of liquids, for example wash solutions or buffer, are referred to as container. Also known are so called microplates in which a multitude of sample vessels (so-called wells) are summarized on a standardized platform, and for the automation of high throughput processes, the samples are arranged in a high density on the platform. Typical microplates used in automation are for example 96 well plates, 384 well plates or 1536 well plates, using which a high number of samples may be systematically examined. Today, microplates are mainly sold in a standardized form (e.g. the ANSI_SLAS_1-4 2004 standard; American National Standards Institute, 2006). The standard concerns on the one hand the type of array and the center distance of the wells as well as the base area of the microplate, the so-called footprint, which is essentially the same for all plate types.

Another type of laboratory article which is particularly used in liquid handling workstations is a carrier onto which for example other vessels such as tubes, containers or microplates may be stored or organized, a pipette tip, or a storage box for pipette tips, which may be places onto a pipette of a pipetting head. Often, such pipette tips are arranged in a corresponding storage box in a standardized array adapted to the array of the pipettes of the pipetting head for easier automation. Such pipette tips are for example disposable pipette tips or so-called fixed pipette tips.

A work surface according to the present invention is an essentially horizontally extending surface which is suitable to have for example carrier or laboratory articles such as tubes or microplates to be placed on. The term work surface here refers to the two-dimensional, flat surface for placing articles or devices thereon, while the term working area refers to the three-dimensional space above the work surface in which for examples movement sequences as part of a process operation take place. Such movements may for example be carried out by a robotic device such as a robotic arm with a gripper, or a pipetting head, but also movements of a user when for example equipping the work surface in preparation of a desired automated process operation.

Typically, a work surface and/or a corresponding working area thereon is accessible by a user from one side, namely from the side where the user is standing in front of the laboratory workstation. By the use of a door, such an access side of a work surface for a user may be controlled. It may be suitable to provide additional protection on those sides of the work surface and the working area, which are typically not foreseen to be manually accessible by a user.

The laboratory workstation may further comprise a robotic device. A typical robotic device is for example a robotic arm comprising a gripper, with which equipment on the work surface may be moved in a targeted manner in the working area, for example for repositioning on the work surface. Another typical robotic device is for example a pipetting head. On a pipetting head, one or more automatically operated pipettes are arranged. A distinction may be made between a single-channel pipetting head which comprises one single pipette, and a multichannel pipetting head which may comprise for example 8 pipettes or more. In liquid handling devices, the use of a multichannel pipetting head comprising for example 96 pipettes is well known.

Usually, the pipettes of a multichannel pipetting head are arranged at a distance from each other equal to the well axis distance of a standard microplate.

An access opening according to the present invention is an opening in the door which allows e.g. a user to reach through the door from outside into the associated device.

Correspondingly, an access opening is a continuously open through opening through the door.

The position of the access opening in the door may be adapted to the dimensions of the area behind the door which shall be accessed through the opening. It may be provided that two or more access openings are present in the door, e.g. with each access opening addressing a defined area behind the door.

In addition, or alternatively, the shape and dimension of the access opening may be adapted to the area behind the door which shall be accessed. For example, the access opening may be of a rectangular shape, a circular shape or other suitable shapes.

When the door is positioned in the safety position, the door provides a full protection of a user against unintentional interference with a machine which is running behind the door. It may be provided that the door comprises a transparent area through which the user may visually inspect the area even though the area is protected against manual access.

In an embodiment of the invention, which may be combined with any other of the embodiments which where or will be mentioned, unless there is a contradiction, the processing unit is configured to allow one or more automated process operations in a part of the working area which is not accessible through the access opening by a user when the door is moved into the loading position.

In an embodiment of the invention, which may be combined with any other of the embodiments which where or will be mentioned, unless there is a contradiction, the processing unit is configured to allow one or more automated process operations in the complete working area when the door is moved in the safety position.

In an embodiment of the invention, which may be combined with any other of the embodiments which where or will be mentioned, unless there is a contradiction, the process unit is configured to restrict or inhibit one or more automated process operations in the working area or in parts thereof when the door is moved into the loading position or into the access position.

In the context of the present invention, allowing describes that the processing unit may give a robotic device the order to execute one or more operations of a desired process. The information about the distinct operations or steps required for a process are typically deposited in a software, to which the processing unit has functional access. It may be provided that in such a software (or software program), not only the operations as such are deposited but additionally the allowed spatial scope. Thus, when allowing one or more process operations, the processing unit may start a deposited software program for the execution of a specific process operation in a defined territorial extend.

Restricting a process may still allow an operation to be carried out, but under well-defined conditions and reduced to a minimum extend, while the inhibition is the total stop of any operation to be carried out. In analogy to allowing a process operation to be carried out in an automated manner, restriction may describe here that specific operations may be executed by a robotic device, while it is deposited in the software, in which working areas the operations may be carried out.

In the context of the present invention, the processing unit may recognize the position of the door for example by the input or the request of a user, which is required by the software to control the execution of one or more process operations by a robotic device. It may be provided that for example a user is required to inform the processing unit in which position he has moved the door, and eventually to confirm that a process operation may be executed by the robotic device(s). There may also be defined security relevant interrupts of one or more processing units, which are deposited in the software in hierarchical definitions, so that for example a pipetting step is in any case finalized before the door is movable out of the safety position. A required input or a request of a user may for example be submitted to the software via a corresponding interface such as a touch screen or another computer surface.

In an embodiment of the invention, which may be combined with any other of the embodiments which where or will be mentioned, unless there is a contradiction, the processing unit (9) is configured to:

- allow one or more automated process operations in a part of the working area (4) which is not accessible through the access opening (8) by a user when the door (1) is moved into the loading position (6), and to
- allow one or more automated process operation in the complete working area (4) when the door (1) is moved in the safety position (5), and to
- restrict or inhibit one or more automated process operations in the working area (4) or in parts thereof when the door (1) is moved into the loading position (7) or into the access position (7).

In an embodiment of the invention, which may be combined with any other of the embodiments which were or will be mentioned, unless there is a contradiction, the door comprises at least one sensor which is functionally connected to the processing unit. The sensor is configured to monitor the position of the door.

The term sensor may refer not only to a single signal detector, but also to a sensor unit comprising a probe or signal detector and a trigger which comprises or releases a signal which is detectable by the probe. It may be provided in this context, when speaking of the door comprising a sensor, the door may comprise either the probe while the device onto which the door is mounted comprises the trigger, or vice versa, the door comprises the trigger while the device onto which the door is mounted comprises the probe. It may particularly be provided that the sensor monitors the position of the door in relation to a work surface or a working area onto which a robotic device may move.

The sensor, or a part thereof, respectively, is functionally connected to the processing unit, in that the processing unit is configured to recognize an incoming signal of the sensor which is indicative for the door being in a defined position, and to process the signal for allowing an automated process to be carried out, depending on the detected position of the door. Thus, with a functionally connected sensor, the processing unit may control one or more automated process operations in dependence of a signal of the sensor.

A sensor may for example be a hall sensor, a light sensor, a capacitive sensor or an inductive sensor, a force sensor, an ultrasonic sensor, or other active or passive sensors.

A sensor may be configured to monitor continuously the position of the door, and/or the processing unit may be configured to continuously control the signals of the sensor, or to control the sensor at predefined time points or in connection with predefined process operations.

In an embodiment of the invention, which may be combined with any other of the embodiments which were or will be mentioned, unless there is a contradiction, the door comprises two or more sensors. In each case, at least one sensor is assigned to the safety position, and/or the loading position, and/or the access position.

It may for example be provided that at least one sensor is assigned to the safety position and to the loading position, while the assignment of a sensor to the access position may be optionally. This may be desired from a safety perspective, because in the safety position and/or in the loading position, the necessity may be higher to control a potential interference of a user with a robotic device. In contrast to this, it may be provided that in the access position, no robotic device is allowed to move anyway.

It may further be provided to use a sensor for monitoring the position of the door also in the access position, for example as a further safeguard measurement.

In an embodiment of the invention, which may be combined with any other of the embodiments which were or will be mentioned, unless there is a contradiction, the door comprises—for being locked in the safety position and/or in the loading position—in each case a locking mechanism, which is functionally connected to the processing unit.

It may be provided that by use of a locking mechanism the door is at least locked in the safety position or in the loading position, as in these cases, robotic devices may be allowed to move, so that a manual user access is required to be further controlled.

In an embodiment of the invention, which may be combined with any other of the embodiments which were or will be mentioned, unless there is a contradiction, each locking mechanism is functionally connected to at least one sensor.

It may be provided that the sensor is configured to monitor the position of the door by monitoring the status of the associated locking mechanism. For example, the sensor may monitor whether the locking mechanism of the door at the safety position is in a closed status and concludes thereof that the door is in the safety position and locked there. In case that the sensor recognizes the locking mechanism at the safety position being in an open status, the sensor may be configured to conclude that the door is not in the safety position. This may for example be provided in particularly robust locking mechanism, which may not easily be overcome by a user unintentionally.

Alternatively, it may be provided that the sensor directly monitors the position of the door, as mentioned above and that a functional connection to the locking mechanism and preferably to the processing unit allows the recognition of the position of the door and a signaling of the sensor to the processing unit to for example activate the locking mechanism changing its state. For example, when the door is recognized by the sensor being in the safety position, the processing unit may activate the locking mechanism to change into a closed state, thereby locking the door in the safety position.

It may be provided that a locking mechanism is functionally connected for example to two separate sensors, one sensor monitoring the status of the locking mechanism as explained above, and one sensor monitoring the position of the door. This may particularly be desired for example at the safety position, for not only locking the door in the safety position but to further allow the control whether the door is indeed kept in the safety position.

The processing unit may here be configured to control one or more automated process operations in dependence of the signal of the one or more sensors which monitor the position of the door.

In an embodiment of the invention, which may be combined with any other of the embodiments which were or will be mentioned, unless there is a contradiction, the processing unit is configured to:

close a locking mechanism for carrying out one or more automated process operations in the working area of parts thereof; and/or keep a locking mechanism locked when an automated process operation is carried out in the working area or in parts thereof; and/or cause one or more automated process operations being carried out in the working area of parts thereof in dependence of the status of the locking mechanism; and/or open a locking mechanism in dependence of the status of one or more automated process operations which are carried out in the working area or parts thereof; and/or keep a locking mechanism open when no automated process operation is carried out in the working area or parts thereof; and/or control the status of a locking mechanism; and/or stop one or more automated process operations which are carried out in the working area or parts thereof when the position of the door is changed or when the status of a locking mechanism is changed.

The status of a locking mechanism refers to the locking mechanism being closes or open. In a closed status, the door is fixed in the respective position and may not be moved, while in the open status, the door is not fixed in the respective position and may be moved for example into another position.

It may be provided for example that the control or the change of the status of a locking mechanism involved the use of one or more sensors, as mentioned above.

Thus, the processing unit, or the underlying software, respectively, may recognize, for example via a sensor, that a process is carried out in the working area, and keeps the door in the position via a locking mechanism, for example until the process is completed, or until a user gives an input or a request to the software, that he/she for example requires a limited access to the working area for loading or reloading. In the latter case, it may be provided that the software allows an interruption of an ongoing process after predefined operations, for example after a pipetting step, in which the involved robotic device(s) are stopped for a user access, and after which the remaining operations may be continued afterwards, when the door is moved back into the safety position. For example, in the case that disposable pipette tips or reagents are running out of stock, the software may stop the ongoing operation (e.g. at a predefined substep) and allows the door being movable out of the safety position.

For controlling whether an automated process operation may be executed or paused, the processing unit may recognize when the door is moved into one of the working positions, for example requiring an input of a user, using a communication with one or more sensors, using a communication with one or more locking mechanism, or a combination thereof.

In an embodiment of the invention, which may be combined with any other of the embodiments which were or will be mentioned, unless there is a contradiction, the locking mechanism is selected from a group comprising a mechanical locking system, an electrical locking system, and a magnetic locking system, or a combination thereof.

It may be provided that a locking mechanism is comprised of two parts, with one part located on the door, and the other part located on the device onto which the door is mounted. The interaction of the two parts for locking is only possible when the door is in the desired position. It may therefore be provided that the door comprises for each position (safety position, loading position, access position) a separate locking mechanism. Alternatively, it may be provided for example that the same locking mechanism is used for two or more positions, of that an individual locking mechanism is used for a specific position.

For example, suitable locking mechanism may be based on the use of a bolt which counteracts with an end stop. The bolt may be located on the door while the end stop is located for example on a laboratory workstation, or vice versa. The position of the bolt or of the end stop may be controlled by the processing unit, to push out for example the bolt at a desired time point, thereby providing that the door may not be moved over a defined position, because the extended bolt may not pass the end stop. For allowing the door being moved out of the position, the bolt may be retracted under the control of the processing unit. The processing unit recognizes the position of the bolt for example by a sensor coupled to the bolt or a corresponding driving mechanism. Alternatively, the end stop may be configured being movable in relation to the bolt, for engaging the bolt when the door shall be locked in a defined position. In this case it may be possible analogously that the movability of the end stop is under the control of the processing unit.

As a further example, a suitable locking mechanism may be based on a ball spring which counteracts with a complementary depression. The ball spring may be located on the door while the complementary depression is located on the laboratory workstation, or vice versa. The ball spring may engage into the complementary depression for locking only when the door is moved into a defined position in relation to the laboratory workstation. The ball spring may be moved out of the depression by the user by using a force, or for example under the control of the processing unit.

In an embodiment of the invention, which may be combined with any other of the embodiments which where or will be mentioned, unless there is a contradiction, the door is configured as a sliding door.

Alternatively, the door may be a rotating door or a flap door.

In an embodiment of the invention, which may be combined with any other of the embodiments which where or will be mentioned, unless there is a contradiction, the door is composed of two or more sliding door parts.

It may be provided that the processing unit is configured to control the position of one or more, preferably of each sliding door part.

In an embodiment of the invention, which may be combined with any other of the embodiments which were or will be mentioned, unless there is a contradiction, the door comprises two access openings.

It may be provided that the door comprises separate access openings for loading or unloading different items on the work surface. For example, one access opening may be provided for loading or unloading samples, while another access opening is provided for loading or unloading reagents and/or laboratory articles such as disposable pipette tips, tubes etc. This concept may be realized for example by defining distinct loading areas on a worktable for the protection of which the door is configured for. Each loading area may be assigned to a distinct access opening and may be configured for allowing the exchange of for example samples, reagents, or laboratory articles. This may require different equipment's for different loading areas, for example specifically assigned storage positions, distinct carrier for carrying either liquid handling tubes or storage boxes for disposable pipette tips, etc. The configuration of the loading area may be deposited in the processing unit and the corresponding software, respectively.

In an embodiment of the invention, which may be combined with any other of the embodiments which were or will be mentioned, unless there is a contradiction, the door is incorporated into a laboratory workstation which comprises the processing unit, or which is configured being connectable to an external processing unit.

A further aspect of the invention concerns a laboratory workstation comprising a door according to the invention, and further comprising:

- a horizontally extending work surface for providing a working area thereon,
- at least one robotic device for carrying out one or more process operations in an automated manner, and
- a processing unit configured for controlling one or more automated process operations.

The laboratory workstation further comprises a door in an embodiment or a combination of embodiments as described above.

The door is movable in relation to the work surface in a vertical direction perpendicular to the work surface between a safety position in which the door closes the working area for manual access of a user, an access position in which the working area is open for manual access of a user, and a loading position. The door comprises an access opening configured for being reversibly changeable between an open, loading status or a closed status.

In the safety position, the access opening is in the closed status by being positioned b the door below the work surface. In the loading position, the access opening is aligned to the work surface into the loading status for allowing limited access to the working area.

The processing unit of the laboratory workstation is configured to control an activity of the at least one robotic device for carrying out one or more automated process operations in the working area or parts thereof in dependence of the position of the door.

The door may be configured according to one of the embodiments as described above, or according to a combination of embodiments.

In an embodiment of the invention, which may be combined with any other of the embodiments which were or will be mentioned, unless there is a contradiction, the door is a slide door which is movable in a vertical direction along one or more guide rails mounted on the laboratory workstation.

Alternatively, the door may be a rotating door or a flap door.

It may be provided that a guide rail comprises a mechanical detent by means of which the door is guided into the desired position. It may be further provided that a sensor is used to monitor whether the door is guided and positioned into the respective position. It may additionally be provided that a locking mechanism is used to keep the door in the respective position, as discussed above and will be discussed below. By way of example, a simple ball spring may be provided in the door which engages a mechanical detent in the guide rail for locking the door in the desired position. For moving the door out of the respective position, a user may simply move the door by force. However, more complex locking mechanism may be possible to provide additional safety measurement, for example to ensure that the door is not moved out of the safety position by simple force of a user. This may involve the use of an additional sensor which monitors the locking mechanism itself.

In an embodiment of the invention, which may be combined with any other of the embodiments which where or will be mentioned, unless there is a contradiction, the door is composed of two or more sliding door parts.

It may be provided that the processing unit is configured to control the position of one or more, preferably of each sliding door part.

In an embodiment of the invention, which may be combined with any other of the embodiments which were or will be mentioned, unless there is a contradiction, the door and/or the laboratory workstation comprises at least one sensor which is functionally connected to the processing unit and which is configured to monitor the position of the door in relation to the work surface of the laboratory workstation.

As explained above in the context of the door, the term sensor may describe herein a sensor unit comprising a probe or signal detector and a trigger which comprises or releases a signal which is detectable by the probe. It may be provided that the door may comprise either the probe while the laboratory workstation onto which the door is mounted comprises the trigger, or vice versa, the door comprises the trigger while the laboratory workstation comprises the probe. It may particularly be provided that the sensor monitors the position of the door in relation to the work surface or the working area of the laboratory workstation.

As mentioned above, the sensor, or a part thereof, respectively, is functionally connected to the processing unit, in that the processing unit is configured to recognize an incoming signal of the sensor which is indicative for the door being in a defined position, and to process the signal for allowing an automated process to be carried out, depending on the detected position of the door. Thus, with a functionally connected sensor, the processing unit may control one or more automated process operations in dependence of a signal of the sensor.

A sensor may for example be a hall sensor, a light sensor (a light barrier), a capacitive sensor or an inductive sensor, a force sensor, an ultrasonic sensor, or other active or passive sensors.

A sensor may be configured to monitor continuously the position of the door, and/or the processing unit may be configured to continuously control the signals of the sensor, or to control the sensor at predefined time points or in connection with predefined process operations.

It may be provided that the laboratory workstation comprises two or more sensors. In each case, at least one sensor is assigned to the safety position, and/or the loading position, and/or the access position.

It may for example be provided that at least one sensor is assigned to the safety position and to the loading position, while the assignment of a sensor to the access position may be optionally. This may be desired from a safety perspective, because in the safety position and/or in the loading position, the necessity may be higher to control a potential interference of a user with a robotic device. In contrast to this, it may be provided that in the access position, no robotic device is allowed to move anyway.

It may further be provided to use a sensor for monitoring the position of the door also in the access position, for example as a further safeguard measurement.

In an embodiment of the invention, which may be combined with any other of the embodiments which were or will be mentioned, unless there is a contradiction, the door and/or the laboratory workstation comprises in each case at least one locking mechanism for locking the door on the laboratory workstation in the safety position and/or in the loading position and/or in the access position. Each locking mechanism is functionally connected to the processing unit.

It may be provided that by use of a locking mechanism the door is at least locked in the safety position or in the loading position, as in these cases, robotic devices may be allowed to move, so that a manual user access is required to be further controlled. It may optionally be provided that in addition, a further locking mechanism is used for locking the door in the access position, as discussed above.

It may be provided that, depending on the embodiment of the locking mechanism, the door is indeed locked at a defined position, which includes the door being fixed at that position. Alternatively, the door may be locked at a position which includes merely blocking the door at the defined position, with the blocking for example allowing the door being movable in a direction which is from a safety aspect acceptable, while blocking a movement into a direction which shall be prohibited. The term locking includes both, locking and blocking.

In an embodiment of the invention, which may be combined with any other of the embodiments which were or will be mentioned, unless there is a contradiction, each locking mechanism is functionally connected to at least one sensor.

It may be provided that the sensor is configured to monitor the position of the door by monitoring the status of the associated locking mechanism. For example, the sensor may monitor whether the locking mechanism of the door at the safety position is in a closed status and concludes thereof that the door is in the safety position and locked there. In case that the sensor recognizes the locking mechanism at the safety position being in an open status, the sensor may be configured to conclude that the door is not in the safety position. This may for example be provided in particularly robust locking mechanism, which may not easily be overcome by a user unintentionally.

Alternatively, it may be provided that the sensor directly monitors the position of the door, as mentioned above and that a functional connection to the locking mechanism and preferably to the processing unit allows the recognition of the position of the door and a signaling of the sensor to the processing unit to for example activate the locking mechanism changing its state. For example, when the door is recognized by the sensor being in the safety position, the processing unit may activate the locking mechanism to change into a closed state, thereby locking the door in the safety position.

It may be provided that a locking mechanism is functionally connected for example to two separate sensors, one sensor monitoring the status of the locking mechanism as explained above, and one sensor monitoring the position of the door. This may particularly be desired for example at the safety position, for not only locking the door in the safety position but to further allow the control whether the door is indeed kept in the safety position.

The processing unit may here be configured to control one or more automated process operations in dependence of the signal of the one or more sensors which monitor the position of the door.

In an embodiment of the invention, which may be combined with any other of the embodiments which were or will be mentioned, unless there is a contradiction, the locking mechanism is selected from a group comprising a mechanical locking system, an electrical locking system, and a magnetic locking system, or a combination thereof.

It may be provided that a locking mechanism is comprised of two parts, with one part located on the door, and the other part located on the device onto which the door is mounted. The interaction of the two parts for locking is only possible when the door is in the desired position. It may therefore be provided that the door comprises for each position (safety position, loading position, access position) a separate locking mechanism. Alternatively, it may be provided for example that the same locking mechanism is used for two or more positions, of that an individual locking mechanism is used for a specific position.

For example, suitable locking mechanism may be based on the use of a bolt which counteracts with an end stop. The bolt may be located on the door while the end stop is located for example on a laboratory workstation, or vice versa. The position of the bolt or of the end stop may be controlled by the processing unit, to push out for example the bolt at a desired time point, thereby providing that the door may not be moved over a defined position, because the extended bolt may not pass the end stop. Such a bolt may rather block the door at a defined position from being moved towards an undesired direction. For allowing the door being moved out of the position, the bolt may be retracted under the control of the processing unit. The processing unit recognizes the position of the bolt for example by a sensor coupled to the bolt or a corresponding driving mechanism. Alternatively, the end stop may be configured being movable in relation to the bolt, for engaging the bolt when the door shall be locked in a defined position. In this case it may be possible analogously that the movability of the end stop is under the control of the processing unit.

As a further example, a suitable locking mechanism may be based on a ball spring which counteracts with a complementary depression. The ball spring may be located on the door while the complementary depression is located on the laboratory workstation, or vice versa. The ball spring may engage into the complementary depression for locking only when the door is moved into a defined position in relation to the laboratory workstation. The ball spring may be moved out of the depression by the user by using a force, or for example under the control of the processing unit.

In an embodiment of the invention, which may be combined with any other of the embodiments which were or will be mentioned, unless there is a contradiction, the laboratory workstation comprises a loading area on the work surface which is manually accessible by a user through the access opening when the access opening is in the loading status. The loading area comprises at least one carrier which is movably mounted on the work surface, the carrier being configured for accommodating one or more laboratory articles and for being moved on the work surface and towards the access opening when the access opening is in the loading status.

A loading area in the context of the present application is understood as the area of the working area which is manually accessible by a user through the access opening when the door is in the loading position. Typically, access is required for example for loading or unloading samples, reagents or disposable pipette tips or other laboratory articles on the work surface. During the loading or unloading process, no robotic devices shall move through the loading area due to safety reasons.

It may be provided that sample containing tubes, reagent container(s) or storage boxes for disposable pipette tips or the like are stored on the work surface on correspondingly adapted carriers. A carrier may provide here the possibility to store the respective article in an organized manner which is also accessible by a robotic device. Such a carrier may be further configured to be movable along the work surface towards or eventually even through the access opening when the door is in the loading position, for simplifying the loading or unloading process. For controlling the position of a carrier on the work surface by the processing unit, a sensor may be used, for example a Hall sensor, with the sensor probe being positioned on the carrier and the signal trigger being positioned on the work surface, or vice versa. If for example two sensors are used it may be possible for the processing unit to detect whether a carrier has been moved out of the access opening, or whether a carrier is positioned on the work surface in a “working position”.

In case the door comprises two or more access openings, it may be provided that correspondingly, two or more loading areas are defined on the work surface and the working area, respectively. For example, one loading area is configured for loading or unloading samples, while another access opening is configured for loading or unloading regents or disposable tips. Two or more access openings, or correspondingly two or more loading areas may be suitable for larger work surfaces. In the case of a smaller work surface, it may be provided that, samples as well as reagents and disposable tips may be loaded or unloaded on one single loading area, which may be provided by a respective assignment of space on the work surface for each element to be loaded or unloaded.

In an embodiment of the invention, which may be combined with any other of the embodiments which were or will be mentioned, unless there is a contradiction, the laboratory workstation comprises an appliance compartment below the work surface for accommodating one or more devices or parts thereof which are required for carrying out an automated process operation.

Such device which is required for carrying out an automated process operation may for example be a cooling unit of a chiller (e.g. a Peltier element) or a heating unit of a heater, container for collecting used pipette tips, for collecting waste liquids, or for storing system liquid, a component of a device for controlling the humidity in the working area, a power supply, pumps, etc.

It may be provided that the appliance compartment is organized in a manner that distinct areas in the appliance compartment are assigned to distinct devices, and that for example one of these areas is accessible by the access opening when the door is in the safety position. For example, it may be provided that in alignment to the access opening in the safety position, a waste box is accessible, so that in case a process operation is carried out automatically by one or more robotic devices in the working area, waste which has been generated during a process may be removed through the access opening.

In an embodiment of the invention, which may be combined with any other of the embodiments which were or will be mentioned, unless there is a contradiction, the door is divided into at least two distinct sections, each section extending by a height h1, h2 in the vertical direction and by a length l1, l2 in a horizontal direction,

- wherein a first, lower loading section of a height h1 and a length l1 comprises the access opening, and wherein a second, upper protection section of a height h2 and a length l1 comprises an optically transparent area for visual inspection of the working area.

In an embodiment of the invention, which may be combined with any other of the embodiments which were or will be mentioned, unless there is a contradiction, the lower appliance compartment comprises a drawer which is manually accessible by a user through the access opening when the door is moved into the safety position.

Such a drawer may for example be configured to take up a waste box, for example for used pipette tips, as mentioned above, which have been ejected after use from a pipette of a pipetting head. It may be foreseen in this case that such ejected pipette tips are guided for example by means of a funnel from the end of a pipette through the work surface into the drawer. The provision of a drawer then allows an easy emptying of a waste container although one or more automated process operations are carried out in the working area and correspondingly, one or more robotic devices are moving there.

In an embodiment of the invention, which may be combined with any other of the embodiments which were or will be mentioned, unless there is a contradiction, the at least one robotic device is selected from a group comprising a robotic arm comprising a gripping mechanism and a pipetting head.

In an embodiment of the present invention, which may be combined with any other of the embodiments which were or will be mentioned, unless there is a contradiction, the laboratory workstation is a liquid handling workstation comprising at least a pipetting head.

Alternatively, the laboratory workstation may be a tube sorter, or a cell culture station for analyzing and incubating cells in culture.

A further aspect of the invention concerns a method of controlling a manual access to a working area of a laboratory workstation, the method comprising the steps of:

Providing a laboratory workstation which comprises:
- a horizontally extending work surface for providing a working area thereon,
- at least one robotic device for carrying out one or more process operations in the working area in an automated manner under the control of a processing unit,
- a door according to the invention which is movable in a vertical direction perpendicular to the work surface for allowing or restricting manual access and which comprises an access opening, and
- a processing unit configured to control one or more automated process operations in the working area or parts thereof in dependence of a position of the door.

Bringing the door into a safety position, and thereby closing the working area for manual access of a user. The processing unit controls that the door is in the safety position.

It may be provided that the processing unit may control this position by a functionally connected sensor and optionally a locking mechanism, as discussed herein. Ideally, the work surface is equipped with the samples, reagents, and laboratory articles (for example with microplates, disposable pipette tips and the like) before closing the working area.

Carrying out one or more process operations in the working area in an automated manner using at least one robotic device under the control of the processing unit.

It may be provided that the user must give a respective command to the processing unit for starting the desired process in the working area.

It may be provided that the processing unit may allow movements of a robotic device in the complete working area.

Pausing the one or more process operations in the working area or parts thereof and afterwards allowing the door being moved into a loading position, each under the control of the processing unit, Moving the door from the safety position into the loading position for allowing limited, manual access of a user to the working area or parts thereof through the access opening.

It may be provided that a user must provide a command to the processing unit that access to the loading area is required, upon which the processing unit may allow that the door may be moved out of the safety position. It may alternatively be provided that the door is moved automatically from the safety position into the loading position.

It may further be provided that upon a command of a user, any movement of a robotic device present in the working area is paused. In case the robotic device(s) is currently moving, the pausing may be foreseen after a certain operation has been finished.

It may alternatively be provided that only movements of present robotic device(s) are paused which occur within the loading area, while other movements and process operations may be carried out which occur outside the loading area. It may be provided in this case that the processing unit is configured to control that the door is moved into the loading position, but not into the access position. This may be realized for example by means of a sensor and a locking mechanism as discussed herein. Via the processing unit, it may be provided that for example a locking mechanism for the safety position is opened and simultaneously, a locking mechanism for the loading position is activated, to prevent that the door is moved over the loading position.

Controlling the door being in the loading position by the processing unit, and

Loading or unloading the work surface through the access opening, while the one or more process operation is paused, and the door is in the loading position under the control of the processing unit.

Loading or reloading the work surface may include for example:
- the unloading of samples from the work surface, for example of samples which have already been treated, for providing space for additional samples;
- the loading of additional samples onto the work surface, which shall be integrated into an already running process operations;
- the loading of reagents or laboratory articles such as disposable pipette tips onto the work surface;
- unloading of reagents or laboratory articles from the work surface, for example for providing space for other reagents or laboratory articles;
- the refilling a reagent in a fluid container, wherein for example an empty container is first unloaded from the work surface, refilled with a reagent outside the laboratory workstation, and afterwards, the refilled fluid container is loaded again onto the work surface; and
- refilling a stock of a laboratory article, for example refilling a storage box with disposable pipette tips, wherein for example an empty storage box is first unloaded from the laboratory workstation, and either refilled with disposable pipette tips and then reloaded onto the work surface, or an already filled storage box is loaded onto the work surface.

The door and/or the laboratory workstation may be configured according to one of the embodiments as described above, or according to a combination of one or more embodiments.

In an embodiment of the present invention, which may be combined with any other of the embodiments which were or will be mentioned, unless there is a contradiction, after loading or unloading the work surface, the method further comprises the step of:

moving the door into the safety position, and controlling the door being in the safety position under the control of the processing unit, and thereafter continuing the paused one or more process operation on the working area under the control of the processing unit. It may be provided that with the door being in the safety position, the full working area may be used for automated processes being carried out.

In an embodiment of the present invention, which may be combined with any other of the embodiments which were or will be mentioned, unless there is a contradiction, the work surface of the laboratory workstation comprises a loading area which is manually accessible by a user through the access opening when the door is in the loading position. For loading or unloading the work surface when the door is in the loading position, process operations which are carried out in the loading area, are paused under the control of the processing unit, while one or more other process operations, which are carried out outside the loading area in the working area, are continued, or all process operations which are carried out in the working area are paused.

As discussed above, in safety position, the access opening is in the closed status by being positioned by the door below the work surface, in the loading position, the access opening is aligned to the work surface into the loading status for allowing limited access to the working area, and in the access position the working area is open for manual access of a user. It may be provided that the processing unit:

allows one or more automated process operations in a part of the working area in a part of the working area which is not accessible through the access opening by a user when the door is moved into the loading position, and/or allows one or more automated process operations in the complete working area when the door is moved into the safety position, and/or restrict or inhibit one or more automated process operations in the working area or parts thereof when the door is moved into the loading position or into the access position.

In an embodiment of the present invention, which may be combined with any other of the embodiments which were or will be mentioned, unless there is a contradiction, the door and/or the laboratory workstation comprises at least one sensor which is functionally connected to the processing unit. The at least one sensor monitors the position of the door in relation to the work surface of the laboratory workstation.

As discussed above, it may be provided that for each of the safety position, the loading position, and the access position, one sensor is assigned, so that all three positions may be monitored. However, it may be provided that at least one sensor is assigned to the safety position and at least one sensor is assigned to the loading position. Additional sensor may be provided for further monitoring a locking mechanism. The discussion and statements made above concerning a sensor apply here as well.

In an embodiment of the present invention, which may be combined with any other of the embodiments which were or will be mentioned, unless there is a contradiction, the door and/or laboratory workstation comprises a locking mechanism for locking the door in the safety position and/or in the loading position and/or in the access position, the locking mechanism being under the control of the processing unit, wherein the processing unit controls one or more automated process operations in dependence of status of the locking mechanism.

In an embodiment of the present invention, which may be combined with any other of the embodiment which were or will be mentioned, unless there is a contradiction, the locking mechanism is functionally connected to at least one sensor. The sensor monitors the position of the door in relation to the work surface of the laboratory workstation by monitoring the status of the associated locking mechanism.

In an embodiment of the present invention, which may be combined with any other of the embodiments which were or will be mentioned, unless there is a contradiction, the processing unit controls:

that a locking mechanism for the door remain locked as long as a robotic device is moving in the working area, when the door is locked in the safety position, and/or that the locking mechanism of the door remain locked as long as a robotic device is moving in the working area but outside the loading area, when the door is locked in the loading position or when the door is locked in the safety position, and/or that a robotic device of the laboratory device does not move when the door is moved into or locked in the access position.

The discussion and statements already made above concerning a sensor, the composition of a sensor, or a sensor unit, respectively, and concerning a locking mechanism apply here as well.

The features of the above-mentioned embodiments of the device/process can be used in any combination, unless they contradict each other.

BRIEF DESCRIPTION OF THE DRAWINGS

Embodiments of the current invention are described in more detail in the following with reference to the figures. These are for illustrative purposes only and are not to be construed as limiting. It shows FIG. 1 a schematic overview drawing of the working area of a laboratory workstation, comprising a gripping mechanism and a pipetting head.

DETAILED DESCRIPTION OF THE INVENTION

Figure 1:
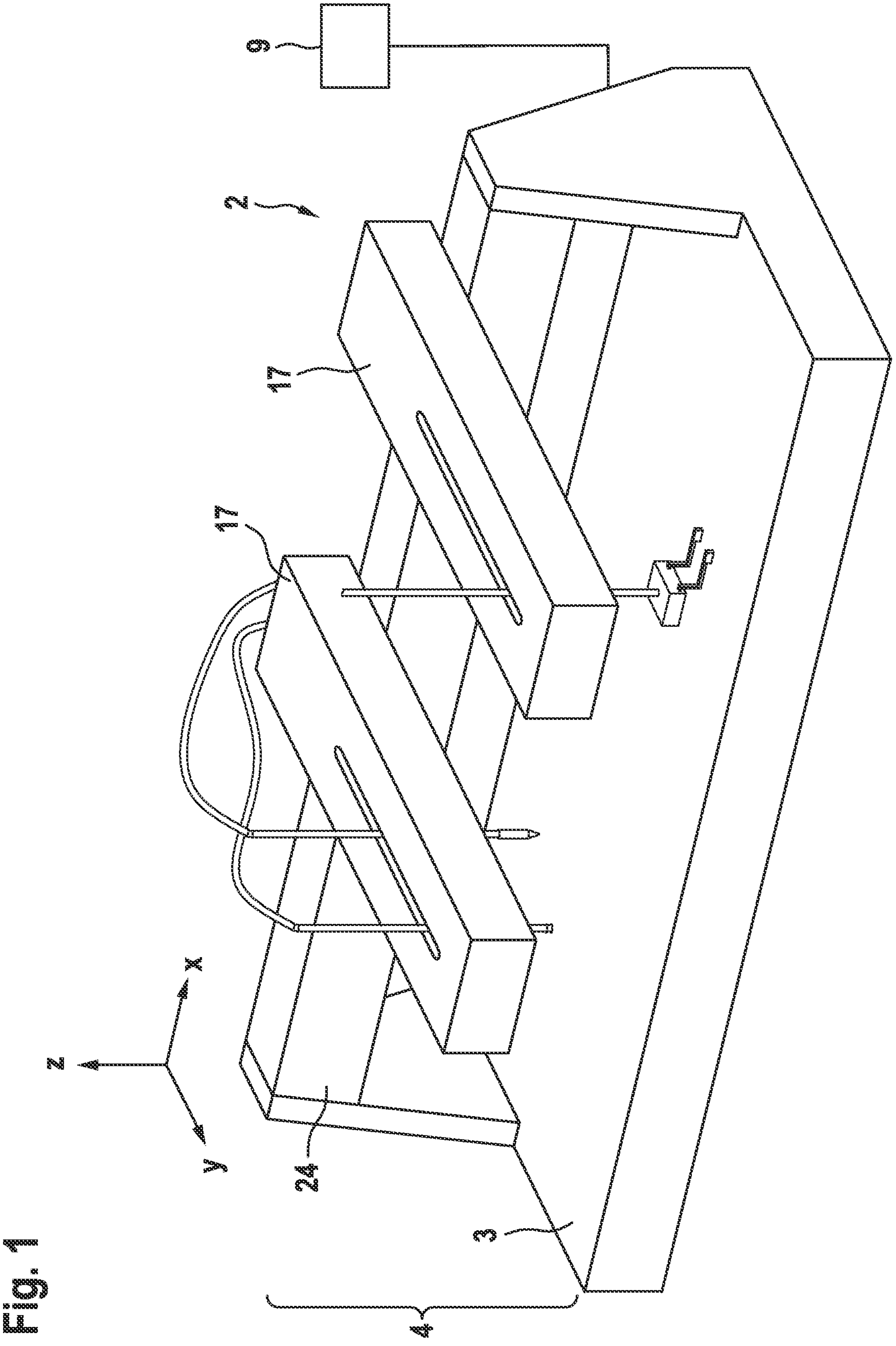

FIG. 1 shows a schematic overview drawing of an exemplary laboratory workstation 2 which may be used in connection with a door 1 of the invention. This laboratory workstation 2 is shown without a door 1 for illustrative purpose. The laboratory workstation 2 comprises a work surface 3, which is shown here exemplarily as a continuous tabletop. Multi-part surfaces are however possible, too. Above the work surface 3 is a working area 4. The work surface 3 indicates a two-dimensional surface onto which for example laboratory articles 23, for example container with samples, or other devices 18 for automated process operations may be placed on, while the working area 4 refers to the three-dimensional space above the work surface 3, in which one or more robotic device 17 move for carrying out one or more process operations. Devices 18 which are required for automated processing and which may be placed onto a work surface are for example shakers for microplates, incubators, microscopes, centrifuges, etc.

A user may have access to the work surface 3 and the working area 4 from the front side, which is the longitudinal side opposite to the guide rail 24 here. The access is controlled by a door, while the other sides of the work surface 3 are blocked for access, for example by housing components (not shown here).

The laboratory workstation 2 shown comprises two robotic devices 17, one is configured as a gripping mechanism (see the arm on the right side), and one is configured as a pipetting head (see the arm on the left side). The gripping mechanism comprises here a gripper with two gripping fingers, while the pipetting head comprises two pipettes in this case. One of the pipettes is shown to have a pipette tip attached (pipette closer to the guide), while the other pipette is shown without an attached pipette tip, revealing the cone-type end.

Each robotic device 17 is movable along an x-direction by means of a guide rail 24. In addition, the gripper of the gripping mechanism is movable also along an y-direction and a z-direction. Analogously, each of the pipettes of the pipetting head is movable along an y-direction and in a z-direction. In this configuration, a majority of the work surface 3 may be addressed by either a pipette or by the gripping mechanism. The presence of two robotic devices 17 leads to a certain restriction of the movability of each robotic device 17 on the guide rail 24 and correspondingly of their access capabilities of the work surface 3. A processing unit 9 is configured to control the movements of each of the robotic devices 17 for carrying out an automated process operation, but also for avoiding potential collisions of present robotic devices 17. As discussed herein, the same processing unit 9 may be used for additionally controlling the position of a door 1, and to integrate the control of the door 1 with the control of the movement of the robotic device(s) 17 and the implementation of process operations, though a separate but functionally connected processing unit 9 is possible as well.

Figure 2:
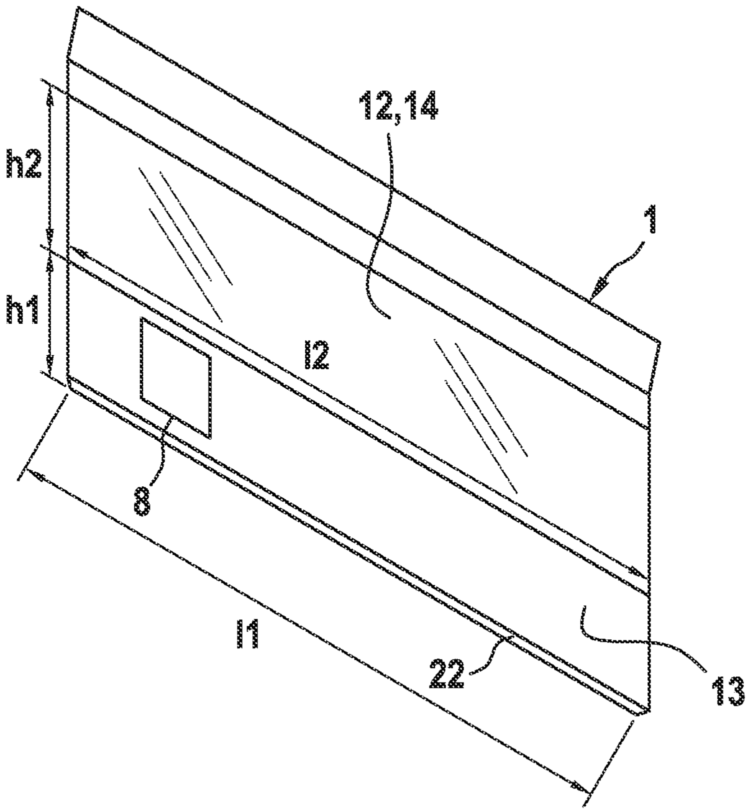
FIG. 2 a schematic overview drawing of a door with an access opening in a frontal view.

FIG. 2 shows a schematic overview drawing of an embodiment of a door 1 with an access opening 8 according to the invention in a frontal view. The access opening 8 is arranged in the lower part of the door 1. The door 1 shown here is particularly suitable for closing a working area 4 of a laboratory workstation 2, for example one as shown in FIG. 1, and is movable in a vertical direction. The vertical direction corresponds here to the z-direction as indicated in FIG. 1, which is perpendicular to the work surface. The door is a sliding door and is movable for example in relation to a work surface 3 by a door rail system comprising door rails 21. Door rails 21 may be anticipated on the right and left sides of the door 1 shown in FIG. 2 and are shown explicitly in FIG. 3. The door 1 comprises at its lower side a grip rail 22. The processing unit 9 to which the locking mechanism 10 and the sensor 11 are functionally connected is not shown here.

The access opening 8 may divide the door 1 into a service section 13 and a protection section 14. The service section 13 of a length l1 and a height h1 corresponds to the lower section of the door 1 where the access opening 8 is arranged. This section allows a limited access of a user to the work surface 3 and/or the working area 4 even though the door 1 is not fully open, in that the access opening 8 is aligned to the work surface 3 accordingly in a loading position 6. The protection section 14 has a length l2 and a height h2 and indicates the area of the door 1 which essentially completely covers the side of a work surface 3 and the working area 4 thereon when the door 1 is in a safety position, so that no manual access of a user is possible. The door 1 comprises in the protection section 14 a transparent area 12, to that a user may nevertheless visually access the shielded working area 4 in the safety position 5.

Figure 3:
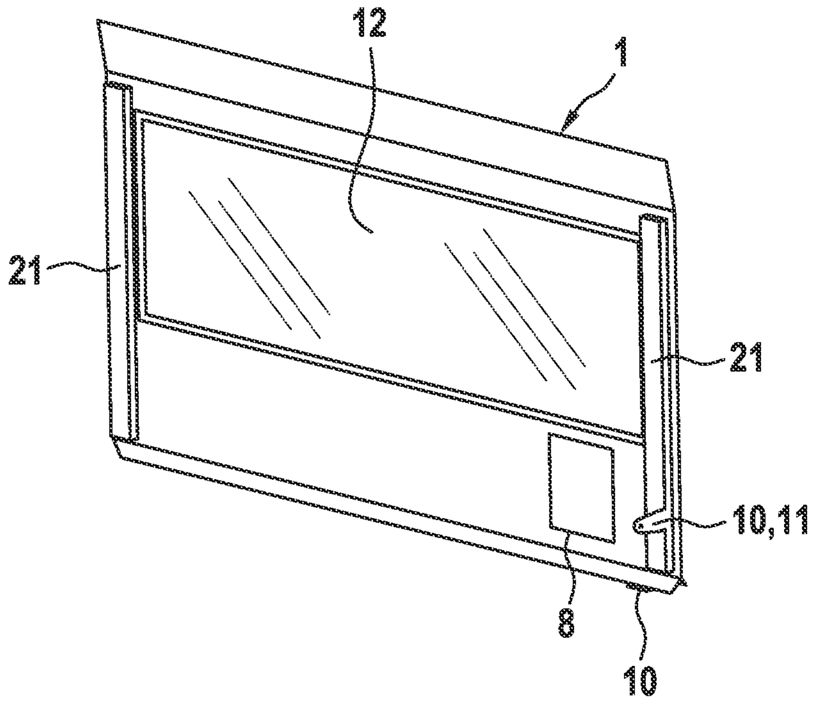
FIG. 3 a schematic overview drawing of a backside of a door with an access opening.

FIG. 3 shows a schematic overview drawing of an embodiment of a door 1 with an access opening 8 according to the invention in a rear view. Also here, the door 1 comprises a transparent area 12 for allowing a visual access to the work surface 3 when the door 1 closes the working area 4 and the work surface 3. The door rails 21 by means of which the door 1 may be movably mounted onto a laboratory workstation 2 can be seen here on the right and on the left side.

A locking mechanism 10 can be seen at the lower side, which is in this embodiment a simple mechanical stop. The locking mechanism 10 here is arranged in combination with a sensor 11. The mechanical stop may provide a locking function to hold the door 1 in the desired position for example in combination with a movable bolt (not shown), which bars the way of the mechanical stop when the bolt is extended and the door 1 is moved. A processing unit 9 (not shown here) may control whether the bolt is extended or retracted, thereby controlling whether the door 1 is kept in a desired position or may be moved out or moved over that position.

An additional locking mechanism 10 which is coupled to a sensor 11 can be seen on the right side of the door 1. This locking mechanism 10 is shown to be shifted sideways to the mechanical stop at the bottom side. This has the advantage that this additional locking mechanism 10 does not interfere with e.g. the movable bolt. The additional locking mechanism 10 may interact with a separate counterpart instead (not shown), while the sensor 11 may indicate the status of this additional locking mechanism, for providing for example information to a processing unit 9 whether it is in a locking status or an open status.

Figure 4:
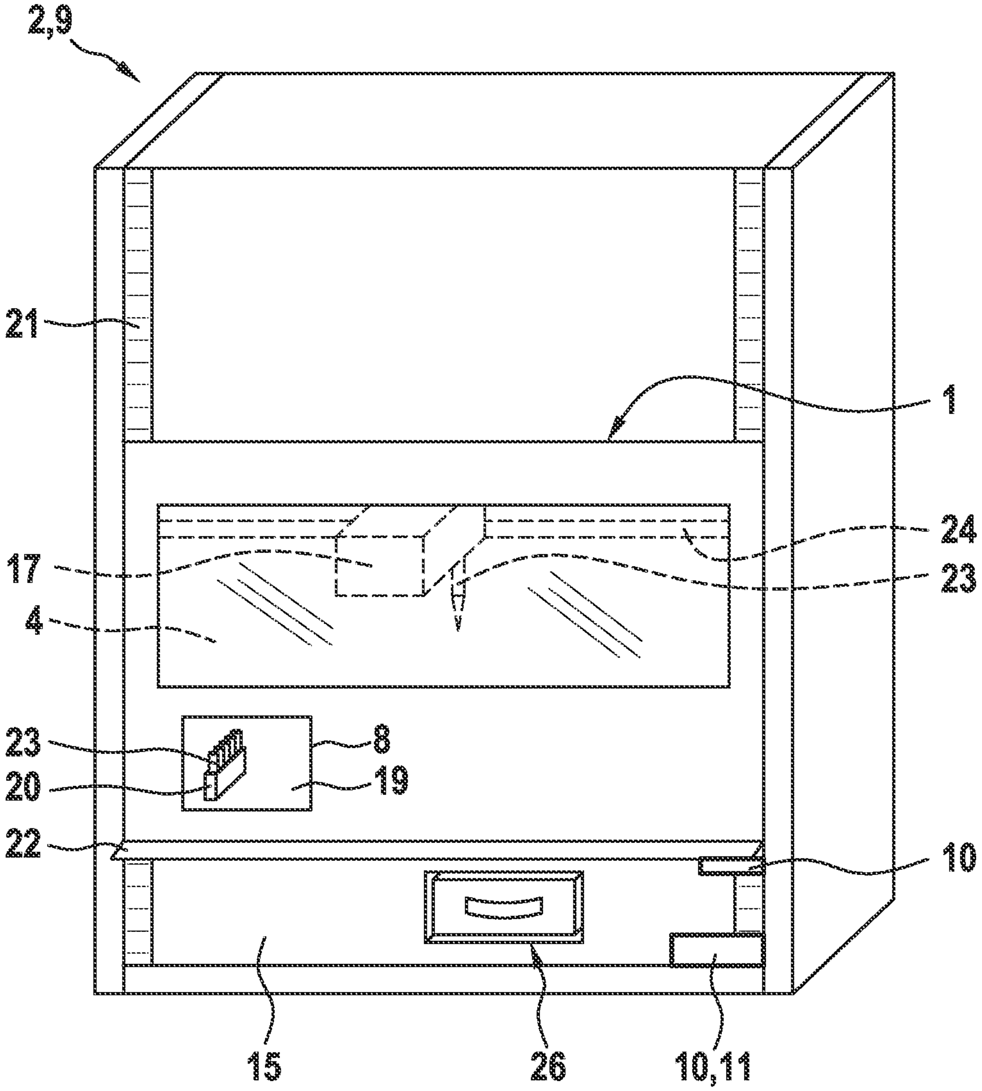
FIG. 4 a schematic overview drawing of a laboratory workstation comprising a door in a loading position and a transparent area, which allows a view onto a pipetting head of the laboratory workstation.

FIG. 4 shown a door 1 according to the invention, which is integrated into a laboratory workstation 2, in this case into a liquid handling workstation. The door 1 is mounted to the liquid handling workstation and movable in a vertical direction along door rails 21. In FIG. 4, the door 1 is shown being in the loading position, so that through the access opening 8 of the door, a carrier 20 with laboratory articles 23 (tubes in this case) being loaded therein can be seen. The loading area 19 behind the door 1 is accessible by the access opening 8 and includes here parts of the work surface 3 and of the working area 4.

The door 1 is shown here for illustrative purposes being open in an area which may be covered by a transparent screen. By this, a robotic device 17, in this case a pipetting head with a pipette and an attached pipette tip can be seen, as well as the guide rail 24 onto which the pipetting head is movably mounted. An integrated processing unit 9 may coordinate the functioning of the liquid handing workstation with the integrated door 1.

Below the working area, the appliance compartment 15 can be seen. This compartment provides for example storage space for instruments or equipment which are required for the automated processing of samples, but which would unnecessarily use up space on the work surface 3 when stored there. For example, cooling units or pipette tip waste container may more adequately be stored outside the working area 4. A waste container box is visible in the appliance compartment 15, while other instruments or parts thereof are hidden here.

Schematically indicated is also a locking mechanism 10 at the lower side of the door 1, which may interact with a complementary locking mechanism 10 at the lower end of the liquid handling workstation. Both may form together one functional locking mechanism 10. A sensor 11 may be used for example to monitor whether the door is in the assigned position, or whether the locking mechanism is in an open or closed status, or both.

The laboratory workstation 2 comprises an integrated processing unit 9 which is not explicitly shown in this Figure.

Structures shown by dashed lines are present in a plane which is behind the visible front plane.

Figure 5A:
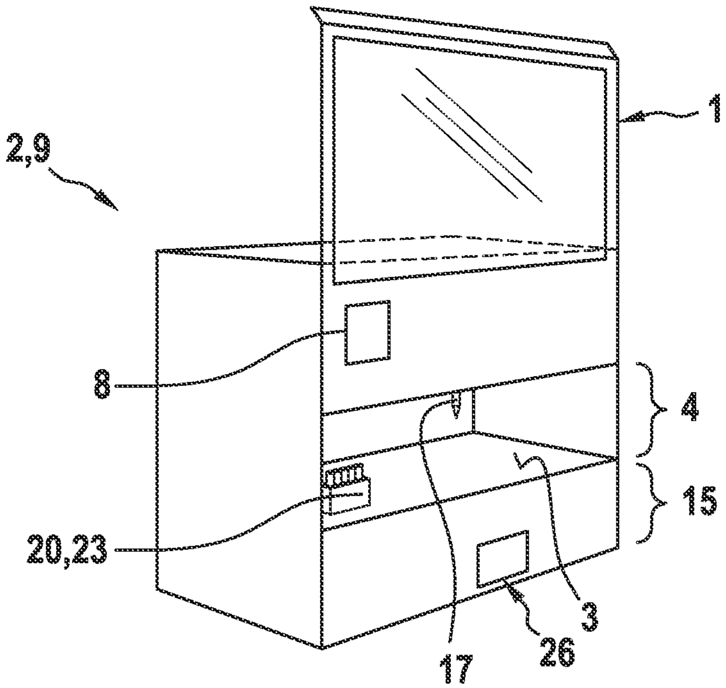
FIGS. 5A-5C perspective views of a laboratory workstation positioned on a bench, the laboratory workstation comprising a door with an access opening, with the door being in FIG. 5A moved into an access position, FIG. 5B moved into a safety position, and FIG. 5C moved into a loading position.
Figure 5B:
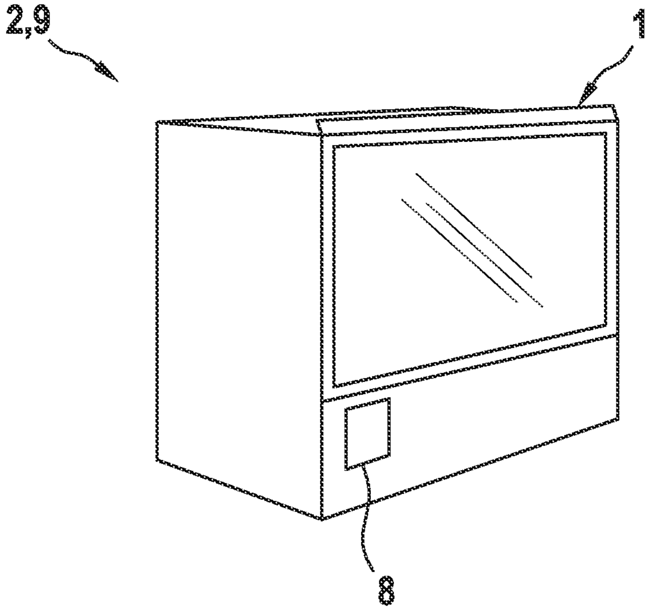
Figure 5C:
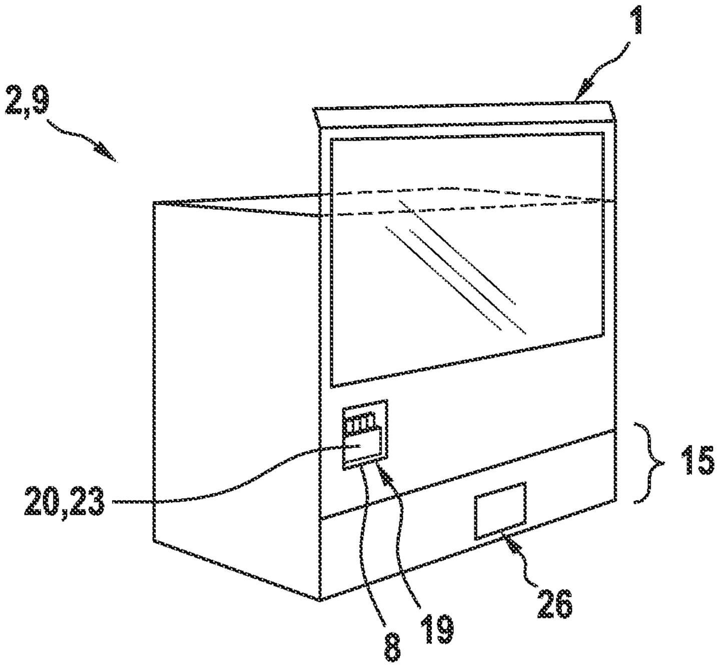

In FIGS. 5A to 5C, a door 1 comprising an access opening 8 is shown to be mounted onto a laboratory workstation 2 and moved in a vertical direction into three different positions. Each laboratory workstation 2 comprises an integrated processing unit 9 here, which is not explicitly shown In FIG. 5A, the door 1 is moved into an access position 7. In this position, the work surface 3 is fully accessible by a user, for example for equipping the work surface 3 for a certain process operation or for exchanging equipment. In FIG. 5A, for example a pipetting head is shown being present as a robotic device 17. Accordingly, the laboratory workstation 2 is configured here as a liquid handling workstation. The pipetting head may move during an automated process operation through the working area 4, although in the access position, the movement of robotic devices 17 is stopped as a safeguard measurement.

On the work surface 3 positioned is a carrier 20 which comprises a multitude of laboratory articles 24, for example reaction tubes. In this case, the carrier 20 is positioned on the work surface 3 within a loading area 19, which remains accessible for a user via the access opening 8 when the door 1 closes the working area 4 in the loading position 6 (compare to FIG. 5C).

The laboratory workstation 2 comprises here below the work surface 3 an appliance compartment 15. The appliance compartment 15 may provide space for devices 18 or parts thereof which are required for carrying out an automated process operation in the working area 4 but shall be removed from the working area 4 for example due to lack of space or for keeping the working area 4 free for movements of the robotic device(s) 17, though such devices are not shown here in the appliance compartment 15. Shown here exemplarily is a shaft 26 of a vertical extension in the appliance compartment 15. The shaft 26 may comprise a drawer which may be pulled out and pushed in. Such a drawer may for example be used as a tablet for a waste bin for used laboratory articles 23 such as disposable pipette tips or microplates. It may be provided that the laboratory workstation 2 comprises more of such shafts 26, or that such a shaft 26 is in a different position in the appliance compartment 15, for example aligned with the access opening 8 when the door 1 is moved into the safety position 5 shown in FIG. 5B. In such an embodiment of the appliance compartment 15, the shaft 26 would be accessible even when the working area 4 is closed for manual access of a user.

The laboratory workstation 2 shown in the FIGS. 5A to 5C further comprises a processing unit 9 which is configured to control the automated process operations as well as the position of the door 1, and hereby the access opening 8 as well, for controlling the user access in dependence of possible movements of a robotic device 17.

In FIG. 5B, the door 1 is moved into the safety position 5. In this position, the door 1 fully covers the side of the working area 4 which is intended for user access, and a manual access of the work surface 3 and the working area 4 is fully inhibited by the door 1, in that the access opening 8 is moved below the work surface 3 and the working area 4. In this embodiment of FIG. 5B, the access opening 4 is positioned in front of a cover of the appliance compartment 15, so that the access opening 8 faces the cover.

With the door 1 being in this safety position 5, automated process operations may be carried out by one or more robotic devices 17 in the working area 4 without the risk of interferences by a user. Typically, the position of the door 1 is under the control of a processing unit 9, which can be the same or functionally connected with the processing unit 9 of the laboratory workstation 2. In this way, the robotic device(s) 17 may be stopped for example when the door 1 is not any more in the safety position 5, or when a user enters a respective request to get access to the loading area by entering a corresponding command.

In FIG. 5C, the door 1 is moved into the loading position 6, in which parts of the working area 4 are covered by the door 1, but in which the access opening 8 opens towards the working area 4, thereby allowing a locally restricted access for a user to the working area 4 and/or the work surface 3. In FIG. 5C, the access opening 8 is aligned to the work surface 3 so that the lower edge of the access opening 8 is about at the same height as the work surface 3. The lower end of the door 1 below the access opening 8 extends further towards the appliance compartment 15, so that the remaining work surface 3 is kept closed for manual access. In this way, the access opening 8 essentially opens completely towards the working area 4. The size of the access opening 8 defines the extend of local, manual access.

Through the access opening 8, a carrier 20 for carrying laboratory articles 23 is visible. Though a user has no access to the remaining working area 4, manual access is possible through the access opening 8 to the loading area 19. A user may therefore take out equipment from the work surface 3 or insert equipment to an area 19 which is defined by the dimensions of the access opening 8. For the ease of access, it may be provided that certain equipment's are for example placed on carrier 20 which are configured as being slidable on the work surface 3 on a defined path. In this way, a user does not need to lift and put down a carrier but may easily let the carrier slide on the work surface out of the access opening and back again.

It may be provided that more than one access opening 8 is present in the door 1 for allowing access of a user to different, defined compartments of the work surface 3 and/or the working area 4. This may however be dependent of the size of the work surface 3.

The shaft 26 is accessible in this embodiment when the door 1 is in the loading position 6. It may be provided in other embodiments that more shafts are present in the appliance compartment 15 or that the storage space in the applicant compartment 15 is organized in a deviating manner; for example, the shaft 26 is a simple opening with an access to the work surface 3.

For ensuring that the door 1 is kept in the desired position, it is particularly suitable to provide door locks which are controlled by the processing unit 9, for example by the aid of one or more sensors 11, as will be shown later.

In FIGS. 6A to 6D, highly schematic overview drawings are shown, illustrating in particular the position of a door 1 in relation to the work surface 3 of a laboratory workstation 2. The door 1 as well as the access opening 8 is shown in bold lines, the laboratory workstation 2 in dashed lines, with a continuous work surface 3. Potentially present robotic devices 1 are not indicated here for overview reasons. The door 1 is movable in a vertical direction and into different positions, the movement direction being indicated by vertical arrows. The safety position 5, the loading position 6, and the access position 7 are indicated exemplarily in FIG. 6C for a better overview, with the horizontal arrows indicating the approximate position of the lower edge of the door 1.

Figure 6A:
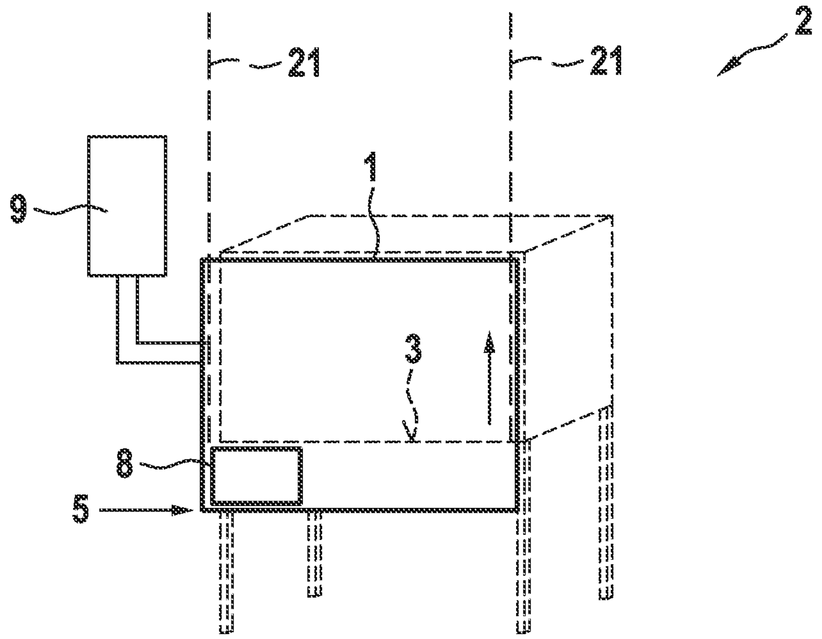
FIGS. 6A-6D schematic overview drawings of a door movable in relation to a work surface of a laboratory workstation in a vertical direction, the door being in FIG. 6A moved into a safety position, FIG. 6B moved into a loading position, FIG. 6C moved into an access position, FIG. 6D composed of two sliding door parts.

In FIG. 6A the door 1 is moved into a safety position 5, in which the working area 4 is essentially fully closed for manual access of a user by the door 1. The access opening 8 is positioned below the work surface 3. The door 1 is movable only upwardly, as in the safety position 5, the door 1 is moved down to the lowest possible point. In the embodiment shown, the door 1 is movable along two door rails 21, each being positioned on one side of the working area 4 and on the laboratory workstation 2. Complementary door rails 21 may be foreseen on the door 1 for allowing movability. The door rails 21 here are shown to extend above the laboratory workstation 2, which might be necessary for providing additional stability.

A processing unit 9 is functionally connected to the laboratory workstation 2 and the door 1 for coordinating one or more automated process operations and the door 1 interactively. In the embodiment shown in FIG. 6A, the laboratory workstation 2 does not comprise an appliance compartment 15.

Figure 6B:
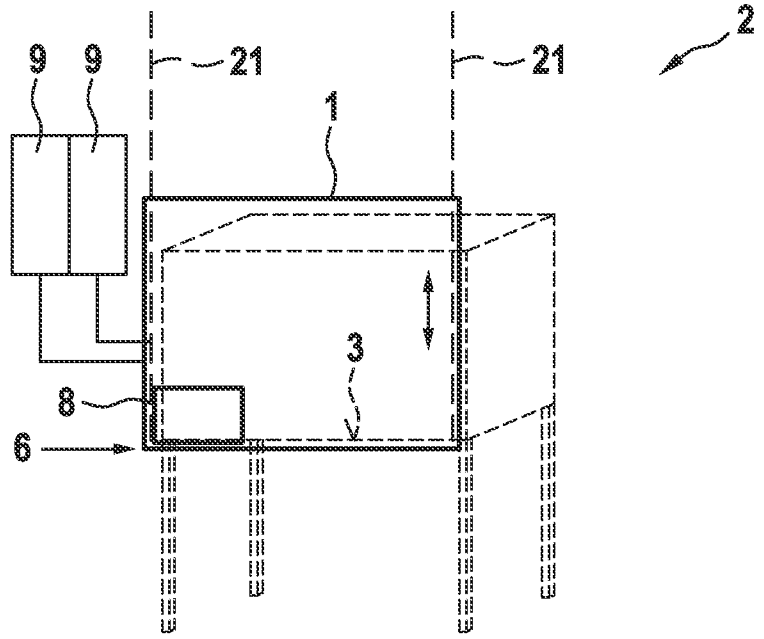

In FIG. 6B, the door 1 is moved into the loading position 6, in which most parts of the working area 4 are still closed by the door 1. However, in the loading position 6, the access opening 8 is aligned to the work surface 3, thereby allowing a limited access for a user through the access opening 8 to the work surface and the working area 4. The processing unit 9 may be configured to restrict the movement of potentially present robotic devices 17 to an area on the work surface 3 which is not accessible through the access opening 8, as a safeguard measurement. In this way, an ongoing automated process operation does not necessarily need to be stopped when the equipment on the work surface 3 needs to be changed but may be continued in a controlled manner in an area which may not be influenced by the access of a user, even when the door is moved out of the safety position.

In FIG. C, the door 1 is moved into the access position 7, in which essentially the complete working area 4 is accessible by a user. In this position, the door 1 is moved up to a height where it does not disturb the manual access of a user, and the presence of the access opening 8 and its position is not of relevance here.

Figure 6C:
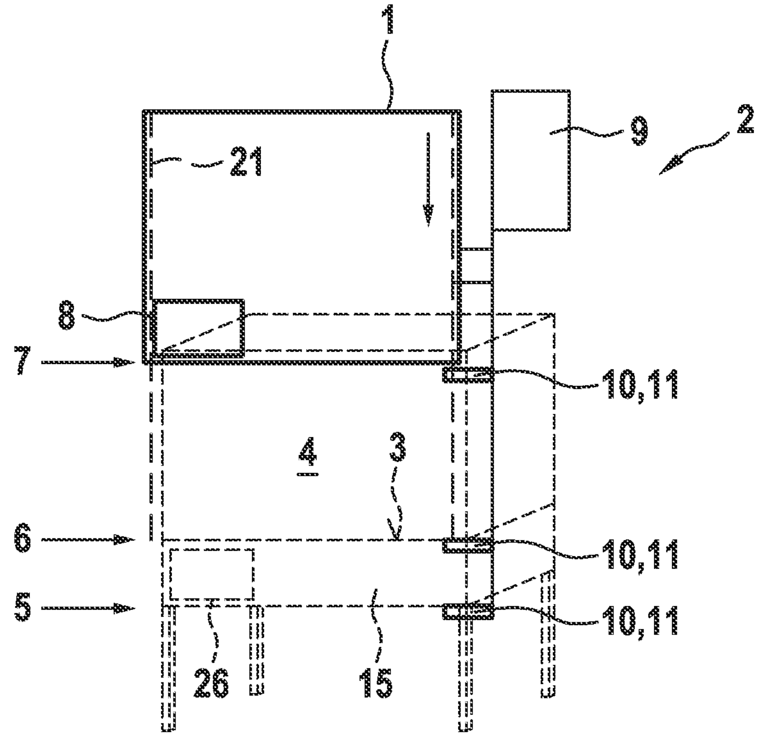

At the height of the safety position 5, the loading position 6, and the access position 7, the laboratory workstation 2 here comprises in each case a locking mechanism 10, and in this exemplary embodiment in each case with a sensor 11. By using the locking mechanism 10, the door 1 may be locked in one of the desired positions 5,6,7. In FIG. 6C, the door 1 is locked in the access position 7. The sensor 11 monitors the status of the locking mechanism at the access position 7 and gives a corresponding feedback to the processing unit 9. In the case when the locking mechanism is not in a closed status and the position of the door 1 is not any more guaranteed, it may be provided that the processing unit 9 triggers a predefined safety measurement. Such safety measurements may be of particular importance when the loading position 6 and/or the safety position 5 are not guaranteed.

The laboratory workstation 2 shown in FIG. 6C comprises an appliance compartment 15, arranged below the work surface 3. In the appliance compartment 15 embedded is an open compartment which provides an easily accessible storage space, for example for a waste box (see FIG. 4). The open compartment may comprise for example a drawer for simplifying the access. A lower appliance compartment 15 will not be covered by the door 1 when the door 1 is in the access position 7. When the door 1 is in the loading position 6, the appliance compartment 15 may be covered by the door 1, fully or partly, when the door 1 has the corresponding dimensions. The door will cover the appliance compartment 15 when being moved and/or locked in the safety position 5 at least partly. In the latter case, at least the open compartment in the appliance compartment 15 may be accessible via the access opening 8 when the access opening is arranged in the door accordingly (compare to FIG. 6D).

Figure 6D:
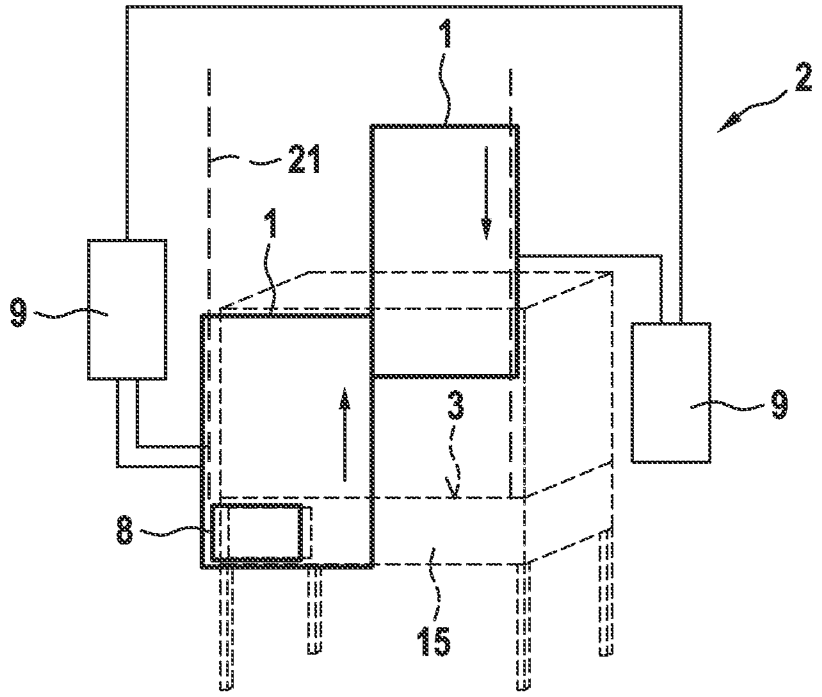

In FIG. 6D, the door 1 is shown in an embodiment comprising two sliding door parts. Exemplarily, each of the door parts is connected to a separate processing unit 9, which however are functionally connected for coordinated operation. The door part on the left side comprises the access opening 8, while the door part on the right side is without such an access opening 8. The left door part is moved into the safety position 5, so that the movement of one or more robotic devices 17 (not shown) may be possible in the working area 4 behind the left door part. Due to the alignment of the shaft 26 with the access opening 8 in this position, access to the shaft 26 is possible. The right door part is moved into the access position 7, in which the user may have full access to the working area 4 in the corresponding area, for example for controlling or handling the equipment in that part of the working area 4.

Figure 7:
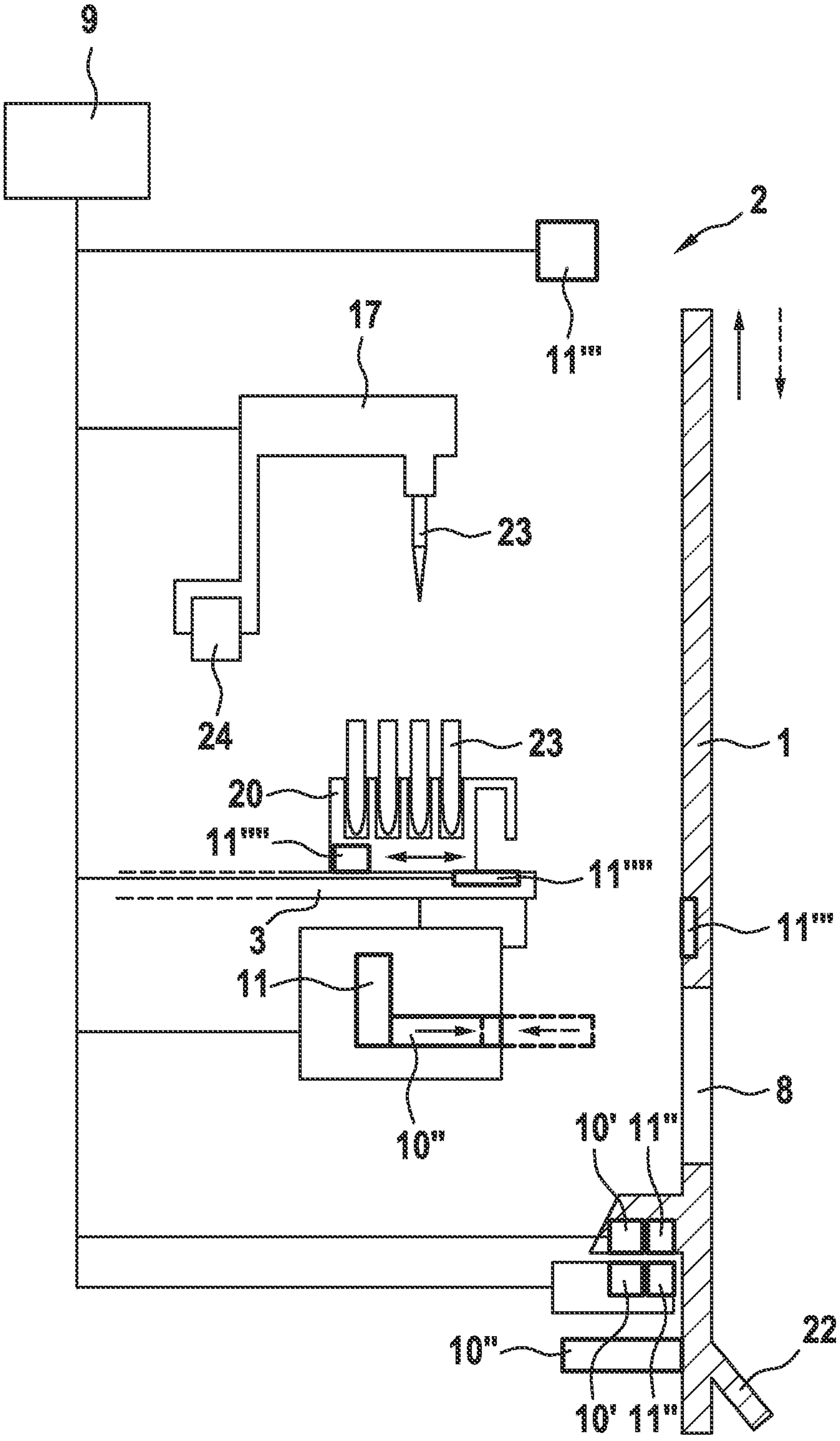
FIG. 7 a highly schematic sectional drawing of the door with two locking mechanism and sensors, shown in relation to a work surface of a laboratory workstation which comprises complementary parts of a locking mechanism and sensors.

FIG. 7 shows a highly schematic sectional drawing of the door plus parts of a laboratory workstation 2 in a longitudinal sectional view with two locking mechanisms 10', 10" and two corresponding sensors 11', 11'", shown in relation to a work surface 3 of a laboratory workstation 2. The laboratory workstation 2comprises complementary parts of a locking mechanism 10', 10" and sensors 11', 11'". The door 1 is shown being essentially moved into the safety position 5. The door 1 is further shown movable in a vertical direction, which is perpendicular to the work surface, indicated by arrows. The dashed arrow hereby indicates the direction of movement after the door 1 has been moved out of the safety position 5, because in this embodiment, the door 1 has reached the lowest possible point at the safety position 5.

The laboratory workstation 2 comprises a robotic device 17 configured as a pipetting head with one pipette and a pipette tip (23) attached. The pipetting head is mounted on a guide rail 24 for being moved under the control of a processing unit 9. The laboratory workstation 2 is thus configured as a liquid handling workstation here.

As mentioned above, the term sensor 11 may describe herein a sensor unit comprising a probe (or signal detector) and a trigger which comprises or releases a signal which is detectable by the probe. It may be provided in this context, when speaking of the door comprising a sensor, the door may comprise either the probe while the device onto which the door is mounted comprises the trigger, or vice versa, the door comprises the trigger while the device onto which the door is mounted comprises the probe. It may particularly be provided that the sensor monitors the position of the door in relation to a work surface or a working area onto which a robotic device may move.

The laboratory workstation 2 and the door 1 are equipped here with various sensors 11, 11', 11''', 11'''', which are partly associated with a locking mechanism 10', 10'', or associated with other functions (see e.g. sensor 11'''').

A carrier 20 is placed onto the work surface 3 and carries exemplarily a reagent tube 23. The carrier 20 is movable on the work surface, which is indicated by the double arrow. A handle on the carrier may simplify the transport by a user. A part of a sensor unit 11'''' is mounted on the work surface 3, while the carrier 20 may comprise the complementary sensor part 11''''. By means of this sensor unit 11'''', the processing unit 9 is able to recognize whether the carrier 20 has been moved towards the door 1 (the access opening 8) for loading or unloading.

The door 1 comprises at the lower end a handle which extends on the right side of the door 1. The door 1 further comprises at the lower end a locking mechanism 10'', which is arranged on the door 1 with an offset to the sectional plane. The locking mechanism 10'' is a stopper here, which protrudes from the door 1 towards the inner side of the laboratory workstation 2. A complementary locking mechanism part 10'' is mounted below the work surface 3, for interacting with the stopper. This complementary part 10'' is configured here as an extendable and retractable bolt, indicated by the arrows. When the bolt is moved towards the door 1 (extended) it blocks the passage of the stopper when the door 1 is moved up. As long as the bolt is kept extended, a passage of the door 1 is blocked and the door 1 may not be moved further upwardly. Thus, the bolt rather functions to block the movement of the door 1 into one direction rather that to fix the door 1 at the position. In the shown embodiment, the door 1 is kept by the locking mechanism 10'' at the loading position 6. A sensor 11 monitors the position of the bolt and provides the information to the processing unit 9 for controlling the position of the bolt (dashed line towards the processing unit 9). It is possible that for example by an additional grating in the housing or in the door rails 21, the holding of the door 1 is further secured.

The door 1 is shown in FIG. 7 in the safety position 5. For holding the door 1 in the safety position, the door comprises a locking mechanism part 10' which interacts with a complementary locking mechanism part 10' of the laboratory workstation 2 to form a functional locking unit for locking the door 1 in the safety position 5. The locking mechanism part 10' on the door 1 is arranged on the trapezoidal protrusion. A locking of the two locking mechanism parts 10', and thereby a locking of the door 1 in the safety position 5, is possible when both parts are moved sufficiently close to each other.

The locking of the door 1 to the locking mechanism part 10' at the safety position 5 may be triggered by a sensor 11' or the interaction of the respective sensor unit parts 11'. A probe recognized the door 1 being in the safety position 5 by recognizing the signal of the trigger, when the probe and the trigger have been moved into a close contact. The probe informs the processing unit 9 that the door 1 has reached the safety position 5, and the processing unit 9 in turn may cause the locking mechanism part 10' to interact and thereby locking the door 1 in the safety position 5.

In the embodiment shown here, the processing unit 9 may further recognize when the door 1 is in the access position 7 via the sensor unit 11'''.

Possible sensors 11 may be, for example, combinations of a Hall sensor and a magnet, a light barrier and a flag, a capacitance proximity sensor, or other sensor types.

Figure 8:
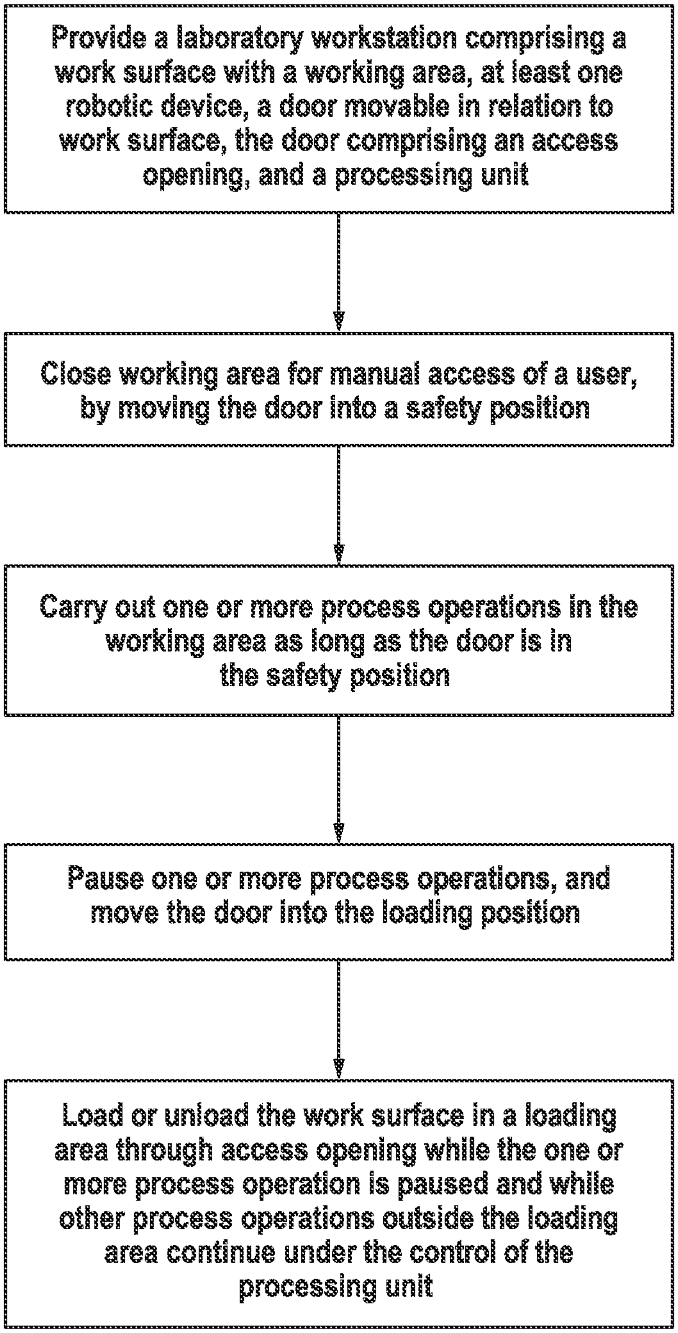
FIG. 8 a schematic overview of possible method steps using the door according to the invention mounted on a laboratory workstation.

In FIG. 8, a schematic overview of possible method steps using the door according to the invention mounted on a laboratory workstation is shown. A laboratory workstation 2 is provided, which comprises a work surface 3 with a working area 4 thereon, at least one robotic device 17 movable in the working area 4, and a door 1 movable in relation to the work surface 3. The door 1 comprises an access opening 8. The door 1 is movable into different positions, for allowing or restricting a manual access of a user to the work surface 3 and the working area 4 through the access opening 8. The laboratory workstation 2 further comprises a processing unit 9, with which movements of the robotic device in the working area 4 for carrying out process operations in an automated manner are controlled, consideration of the position of the door and the access possibility for a user to the working area 4.

The working area 4 is closed for manual access of a user, by bringing the door 1 into a safety position. In this position, the access opening is not facing the working area 4. Typically, the user as already equipped the work surface 3, for example with the samples, reagents, microplates, storage boxes for disposable pipette tips, etc.

When the door 1 is moved into the safety position 5, one or more process operations may be carried out in the working area 4, without the risk of interferences by a user. It may be necessary that a user informs the processing unit 9 that he has moved the door 1 into the safety position, and that the desired process may be started. This may for example be done by pressing a button on a touchscreen or by entering a respective command into a computer which comprises or is functionally connected to the processing unit 9. It is possible that after such a command or input, the software first causes that the door 1 is locked by a locking mechanism 10 in the safety position 5, and only after the locking the process operations are started effectively. The software may control the locking via sensors, as described herein.

In case the user needs access to the working area 4 or the work surface 3 during the running of the desired process, the user typically informs the processing unit 9 accordingly, for adapting the movements of the robotic device(s) 17 e.g. under safety aspects. For example, one or more process operations may be paused when they require the movement of a robotic device 17 in the loading area 19, that is in the area which would be manually accessible by a user when the door 1 is moved into the loading position 6. Certain operations may be finished to not risk the complete process being void. It may be defined however that such process operations which require movement of a robotic device (17) outside the loading area 19 continue.

It may be possible that the processing unit 9 needs to unlock the door 1 from the safety position prior to the door 1 being movable out of the safety position 5. The processing unit 9 may here trigger to open the respective locking mechanism 10, for example by using sensors for monitoring the status of that locking mechanism 10. When the required conditions are met, the door 1 may be moved into the loading position 6.

It is possible that for example upon opening the locking mechanism 10 of the safety position 5, a further locking mechanism 10 of the loading position 6 is activated. Such a mutual coordination may be under the control of the processing unit 9.

With the door 1 being moved or even locked into the loading position, a user may then for example remove items from the work surface 3 or load additional items, or correct a position of previously placed items while any process operation which require the movement of a robotic device 17 in the loading area 19 is paused. Depending on the process which shall be carried out, other operations involving the movement of a robotic device 17 outside the loading area 19 may continue. Exemplarily, a user may want to load additional samples, for example emergency samples which have arrived only after the starting of the desired process, or reagents which are required for the process need to be refilled, or storage boxes for pipette tips need to be provided.

After having loaded or unloaded the work surface 3, the user moves the door 1 back into the safety position 5 for letting the process operation being continued. It may be possible that the locking mechanism 10 at the loading position 6 selectively allows the movement of the door 1 downwardly, while blocking an upward movement of the door 1 (which would allow broader manual access of the user to the working area, resulting in potentially dangerous interference of a user with a moving robotic device 17). Via a sensor 11, the processing unit 9 however recognized as soon as the door as reached the safety position 5 and causes the locking mechanism at the safety position 5 locking the door 1 there.

Depending on the situation, the process operation may be continued as soon as the is moved (and locked, respectively) in the safety position, or the process operation may be stopped.

REFERENCE SIGNS LIST

1 door
2 laboratory workstation
3 work surface processes
4 working area
5 safety position
6 loading position
7 access position
8 access opening
9 processing unit
10 locking mechanism
11 sensor
12 transparent area
13 service section
14 protection section
15 appliance compartment
17 robotic device
18 device for automated
19 loading area
20 carrier
21 door rail
22 grip rail
23 laboratory article
24 guide rail for robotic device(s)
26 shaft
h1 height of the service section
h2 height of the protection section
l1 length of the service section
l2 length of the protection section

The invention claimed is:

1. A laboratory workstation (2) comprising:
a horizontally extending work surface (3) defining a working area (4) thereon,
at least one robotic device (17) for carrying out one or more automated process operations in at least a part of the working area (4),
a processing unit (9) configured for controlling the one or more automated process operations, and
a door (1) with an access opening (8) at a fixed location in the door (1),
wherein the door (1) is configured to be movable in relation to the work surface (3) in a vertical direction perpendicular to the work surface (3) between a safety position (5) in which the door (1) closes the working area (4) for manual access of a user, an access position (7) in which the working area (4) is open for manual access of the user, and a loading position (6),
wherein the access opening (8) in the door (1) is moved between an open status, a loading status, and a closed status as the door (1) is moved between the access position (7), the loading position (6), and the safety position (5), respectively, wherein the user has limited manual access to the working area (4) in the loading status and the user has no access to the working area (4) in the closed status,
wherein, when the door (1) is in the safety position (5), the access opening (8) is positioned below the work surface (3) and is in the closed status, and wherein, when the door (1) is in the loading position (6), the access opening (8) is aligned to the work surface (3) and is in the loading status so that the user is allowed limited access to the working area (4),
wherein positioning of the door (1) is under control of the processing unit (9) which is configured to control an activity of the at least one robotic device (17) for carrying out the one or more automated process operations in at least a part of the working area (4) in dependence of a present position of the door (1); and
wherein the processing unit (9) is located at the laboratory workstation (2) or is configured to be connectable to the laboratory workstation (2).

2. The laboratory workstation (2) according to claim 1, wherein the processing unit (9) is configured to
allow one or more automated process operations in a part of the working area (4) which is not accessible through the access opening (8) by a user when the door (1) is moved into the loading position (6), and/or
allow one or more automated process operations in the complete working area (4) when the door (1) is moved into the safety position (5), and/or
restrict or inhibit one or more automated process operations in at least a part of the working area (4) when the door (1) is moved into the loading position (6) or into the access position (7).

3. The laboratory workstation (2) according to claim 1, wherein the door (1) is a slide door (1) which is movable in a vertical direction along one or more guide rails (21) mounted on the laboratory workstation (2).

4. The laboratory workstation (2) according to claim 1, wherein the door (1) and/or the laboratory workstation (2) comprises at least one sensor (11) which is functionally connected to the processing unit (9), and which is configured to monitor the present position of the door (1) in relation to the work surface (3) of the laboratory workstation (2).

5. The laboratory workstation (2) according to claim 1, wherein the door (1) and/or the laboratory workstation (2) comprises in each case at least one locking mechanism (10) for locking the door (1) on the laboratory workstation (2) in the safety position (5) and/or in the loading position (6) and/or in the access position (7), wherein each of the at least one locking mechanisms (10) is functionally connected to the processing unit (9).

6. The laboratory workstation (2) according to claim 5, wherein each of the at least one locking mechanisms (10) is functionally connected to at least one sensor (11).

7. The laboratory workstation (2) according to claim 6, wherein the processing unit (9) is configured to:

close the locking mechanism (10) for carrying out one or more automated process operations in at least a part of the working area (4); and/or keep the locking mechanism (10) locked when an automated process operation is carried out in at least a part of the working area (4); and/or cause one or more automated process operations to be carried out in at least a part of the working area (4) in dependence of a status of the locking mechanism (10); and/or open the locking mechanism (10) in dependence of a status of one or more automated process operations which are carried out in at least a part of the working area (4); and/or keep the locking mechanism (10) open when no one or more automated process operation are carried out in at least a part of the working area (4); and/or control the status of the locking mechanism (1); and/or stop one or more automated process operations which are carried in at least a part of the working area (4) when the present position of the door (1) is changed or when the status of the locking mechanism is changed.

8. The laboratory workstation (2) according to claim 5, wherein each of the at least one locking mechanisms (10) is selected from a group comprising a mechanical locking system, an electrical locking system, a magnetic locking system, and a combination thereof.

9. The laboratory workstation (2) according to claim 1, comprising a loading area (19) on the work surface (3) which is manually accessible by a user through the access opening (8) when the access opening (8) is in the loading status, the loading area (19) comprising at least one carrier (20) which is movably fixed on the work surface (3), the carrier (20) being configured for accommodating one or more laboratory articles (21) and for being moved on the work surface (3) and towards the access opening (8) when the access opening (8) is in the loading status.

10. The laboratory workstation according to claim 1, comprising an appliance compartment (15) below the work surface (3) for accommodating at least parts of one or more devices (18) which are required for carrying out the one or more automated process operations.

11. A method of controlling a manual access to a working area (4) of a laboratory workstation (2), the method comprising the steps of:

providing a laboratory workstation (2) comprising:

a horizontally extending work surface (3) defining a working area (4) thereon, at least one robotic device (17) for carrying out one or more automated process operations in at least parts of the working area (4), a door (1) with an access opening at a fixed location in the door (1), wherein the door (1) is movable in relation to the work surface (3) in a vertical direction perpendicular to the work surface (3) between a safety position (5) in which the door (1) closes the working area (4) for manual access of a user, an access position (7) in which the working area (4) is open for manual access of the user, and a loading position (6), and a processing unit (9) configured for controlling one or more automated process operations in at least parts of the working area (4) or in dependence of a present position of the door (1);

bringing the door (1) into a safety position (5) so that the access opening (8) is positioned below a level of the work surface (3), thereby closing the working area (4) for manual access of a user, under control of the processing unit (9), carrying out one or more automated process operations in the working area (4) in an automated manner by the robotic device (17) under the control of the processing unit (9), pausing the one or more automated process operations in at least parts of the working area (4) and afterwards allowing the door (1) to be moved into a loading position (6), each under the control of the processing unit (9), moving the door (1) from the safety position (5) into the loading position (6) so that a user has limited, manual access to at least parts of the working area (4) through the access opening (8) under control of the processing unit (9); and loading or unloading the work surface (3) through the access opening (8), while the one or more automated process operations are paused, and the door (1) is in the loading position (6) under the control of the processing unit (9).

12. The method according to claim 11, wherein after loading or unloading the work surface (3), the method further comprises the step of:

moving the door (1) into the safety position (6) under the control of the processing unit (9), and thereafter continuing the paused one or more automated process operations on the working area (4) under the control of the processing unit (9).

13. The method according to claim 11, wherein the work surface (3) of the laboratory workstation (2) comprises a loading area (19) which is manually accessible by a user through the access opening (8) when the door (1) is in the loading position (5), wherein for loading or unloading the work surface (3), when the door (1) is in the loading position (6), those of the one or more automated process operations which are carried out in the loading area (19) are paused under the control of the processing unit (9), while those of the one or more automated process operations which are carried out outside the loading area (19) in the working area (4) are continued, or all of the one or more automated process operations which are carried out in the working area (4) are paused.

14. The method according to claim 11, wherein the door (1) and/or the laboratory workstation (2) comprises a locking mechanism (10) for locking the door (1) in the safety position (5) and/or in the loading position (6) and/or in the access position (7), the locking mechanism being under the control of the processing unit (9), wherein the processing unit (9) controls one or more automated process operations in dependence of a status of the locking mechanism (10).

15. The method according to claim 14, wherein the locking mechanism (10) is functionally connected to a sensor (11), and wherein the sensor (11) monitors the present position of the door (1) in relation to the work surface (3) of the laboratory workstation (2) by monitoring the status of the locking mechanism (10).

16. The method according to claim 15, wherein the processing unit (9) is configured to control the locking mechanism (10) so that the locking mechanism (10) for the door (1) remains locked as long as the robotic device (17) is moving in the working area (4), when the door (1) is locked in the safety position (5), and/or the locking mechanism (10) so that the locking mechanism (10) of the door (1) remains locked as long as the robotic device (17) is moving in the working area (4) but outside the loading area (19), when the door (1) is locked in the loading position (6) or when the door (1) is locked in the safety position (5), and/or the robotic device (17) so that the robotic device (17) of the laboratory device (2) does not move when the door (1) is moved into or locked in the access position (7).

* * * * *